(12) United States Patent
Hattar et al.

(10) Patent No.: US 11,488,124 B2
(45) Date of Patent: Nov. 1, 2022

(54) PAYMENT SYSTEM BASED ON A GLOBAL DATABASE OF INVOICES

(71) Applicant: Hattar Tanin LLC, Novato, CA (US)

(72) Inventors: Saadeh Hattar, Novato, CA (US); Volodymyr Tanin, Kiev (UA)

(73) Assignee: MONEY FLOW, LLC, Novato, CA (US)

( * ) Notice: Subject to any disclaimer, the term of this patent is extended or adjusted under 35 U.S.C. 154(b) by 66 days.

(21) Appl. No.: 15/336,623

(22) Filed: Oct. 27, 2016

(65) Prior Publication Data

US 2017/0161730 A1 Jun. 8, 2017

Related U.S. Application Data

(60) Provisional application No. 62/263,819, filed on Dec. 7, 2015.

(51) Int. Cl.
*G06Q 20/40* (2012.01)
*G06Q 20/14* (2012.01)
*G06Q 20/10* (2012.01)
*G07F 19/00* (2006.01)

(52) U.S. Cl.
CPC ......... *G06Q 20/14* (2013.01); *G06Q 20/1085* (2013.01); *G07F 19/203* (2013.01); *G06Q 2220/00* (2013.01)

(58) Field of Classification Search
CPC ........ G06Q 20/40; G06Q 30/00; G06Q 30/06; G06F 17/00
See application file for complete search history.

(56) References Cited

U.S. PATENT DOCUMENTS

| | | | | |
|---|---|---|---|---|
| 7,376,587 | B1* | 5/2008 | Neofytides | G06Q 30/0615 705/26.35 |
| 7,747,523 | B2* | 6/2010 | Cohen | G06Q 20/108 705/39 |
| 2007/0007332 | A1* | 1/2007 | Hansen | G06Q 99/00 235/379 |
| 2007/0255653 | A1* | 11/2007 | Tumminaro | G06Q 20/327 705/39 |

(Continued)

*Primary Examiner* — Patrick McAtee
*Assistant Examiner* — Nakia Leffall-Allen
(74) *Attorney, Agent, or Firm* — Buckley, Maschoff & Talwalkar LLC

(57) ABSTRACT

Systems and methods for secure purchasing are provided in which, at a merchant device, an invoice is generated comprising a remittance amount and a merchant identification. The invoice is associated with an invoice identification. The invoice is transmitted to a remote invoice database. At a consumer device, the invoice identification is received. A request that includes the invoice identification is transmitted to the invoice database. Information about the invoice is received from the invoice database including the remittance amount and merchant identification. The remittance amount, merchant identification, and a prompt to confirm the invoice are displayed. Responsive to receiving approval from the consumer, the invoice is transmitted to a remote account database comprising an account corresponding to the consumer. At a device associated with the remote account database, after receiving the approval of the invoice from the consumer device, the amount of the invoice is remitted to the merchant.

9 Claims, 10 Drawing Sheets

(56) References Cited

U.S. PATENT DOCUMENTS

| | | | | |
|---|---|---|---|---|
| 2012/0271712 | A1* | 10/2012 | Katzin | G06Q 20/387 |
| | | | | 705/14.51 |
| 2012/0284101 | A1* | 11/2012 | Schiller | G06Q 30/02 |
| | | | | 705/16 |
| 2012/0330769 | A1* | 12/2012 | Arceo | G06Q 20/32 |
| | | | | 455/411 |
| 2013/0073365 | A1* | 3/2013 | McCarthy | G06Q 20/401 |
| | | | | 705/26.35 |
| 2013/0206834 | A1* | 8/2013 | Itwaru | G06Q 20/3276 |
| | | | | 235/379 |
| 2014/0058862 | A1* | 2/2014 | Celkonas | G06Q 20/20 |
| | | | | 705/18 |
| 2015/0032627 | A1* | 1/2015 | Dill | G06Q 20/385 |
| | | | | 705/44 |
| 2015/0363778 | A1* | 12/2015 | Ronca | G06Q 20/065 |
| | | | | 705/71 |

* cited by examiner

PAYMENT SYSTEM BASED ON A GLOBAL DATABASE OF INVOICES

CROSS REFERENCE TO RELATED APPLICATION

This application claims priority to U.S. Provisional Patent Application No. 62/263,819, entitled "Payment System Based on a Global Database of Invoices," filed Dec. 7, 2015, which is hereby incorporated by reference.

TECHNICAL FIELD

This specification describes technologies relating to secure purchasing.

BACKGROUND

Payment systems based on ATM cards, credit cards, or debit cards have potential security flaws because they give third parties access to a user's account. Thus, what is need in the art are more secure systems for secure purchasing.

Current systems, like a) magnet stripe credit cards; b) chip credit cards; c) payment systems, based on tokens, are based on a User-Passive Nature, providing permission to withdraw money from client's account. Token payment systems or credit cards provide permission to withdraw any sum, and the customer is (1) unable to specify amount, and (2) unable to specify the receiver. Such systems are vulnerable because such permissions can be copied, predicted, and/or used to take more than was authorized from a controlled account.

SUMMARY

The following presents a summary of the present disclosure in order to provide a basic understanding of some of the aspects of the present disclosure. This summary is not an extensive overview of the present disclosure. It is not intended to identify key/critical elements of the invention or to delineate the scope of the invention. Its sole purpose is to present some of the concepts of the present disclosure in a simplified form as a prelude to the more detailed description that is presented later.

Various embodiments of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various embodiments are used.

An aspect of the present disclosure is directed to technical solutions (e.g., computing systems, methods, and non-transitory computer readable storage mediums) are provided to address the shortcomings in the prior art. The systems and methods of the present disclosure ensure that there is no possibility for third parties to get access to the confidential information of the card holder. Confidential information is exchanged only between the user and the user's bank directly. System are also disclosed that bestow personal responsibility of cash funds on a receiver in terms of why and for what each sum of money is being transferred to the receiver. Application of such principles has the further advantage that enables government entities, such as states, counties, and municipalities, to access such financial transactions for purposes of exacting applicable taxation. For instance, even in the case of historically difficult to track transactions, such as Farmer's Market transactions, it is possible to impose appropriate taxes on sold goods.

The disclosed systems and methods also allow users to receive cash transfer nearly everywhere and anytime, that are transferred by a payer from any point connected to the disclosed system, without any requirement that the user have an ATM card, credit card, debit card, ID card, or other forms of physical credentials. The user need only use only their own bank, with whom the user is used to working with and trusts. Nothing else is required and all payments are made using an efficient procedure imposed using the disclosed systems and methods. In the case of Internet transactions or other transactions, the buyer/payer (user) may generate an invoice and pay it.

A new payment system based on a global source and/or global database (interchangeably named a global source and/or global database/database, and/or global base of bills to pay/base of bills to pay, and/or global invoice database, and/or global database of invoices) of invoices is proposed. A seller/receiver puts an invoice into a global database and transmits the invoice number/code/ID to a buyer/payer. The buyer/payer contacts the global database of invoices, verifies the invoice and sends it to his bank to pay. The bank can also verify the invoice by using the global database of invoices.

Any seller/receiver is able to put an invoice into the database and anybody (or, in case of necessity, specified person(s)), who has the number/code/ID of the invoice can pay it. The number/code/ID of the invoice can be obtained by the payer/buyer simply by seeing/typing the number, by copy/pasting (Internet payment) and/or by optical recognition (digits/numbers and/or barcode, and/or QR code) from the screen and/or check provided by the seller/receiver to the buyer/payer, and/or via wireless/wave-base signal or otherwise.

The new payment system overcomes potential flaws of conventional card credentials such as ATM cards, debit cards, and credit cards since no access to the user's account is given to any third parties.

Every buyer can get a history of paid bills, including contacting merchants, if something goes wrong with purchased goods. Such approaches, with higher operational control, provide the possibility to lower the quantity of unlicensed activity.

The discloses systems enable the receipt of a cash transfer nearly everywhere and anytime by a receiver, which is transferred by a payer from any point connected to the disclosed system, and at the same time, the specified receiver may have no physical cards in their possession (e.g. no credit card, no access to bank/payment system client, no credentials/personal ID documents) to receive cash money, which was sent to the receiver.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

Figure 3:
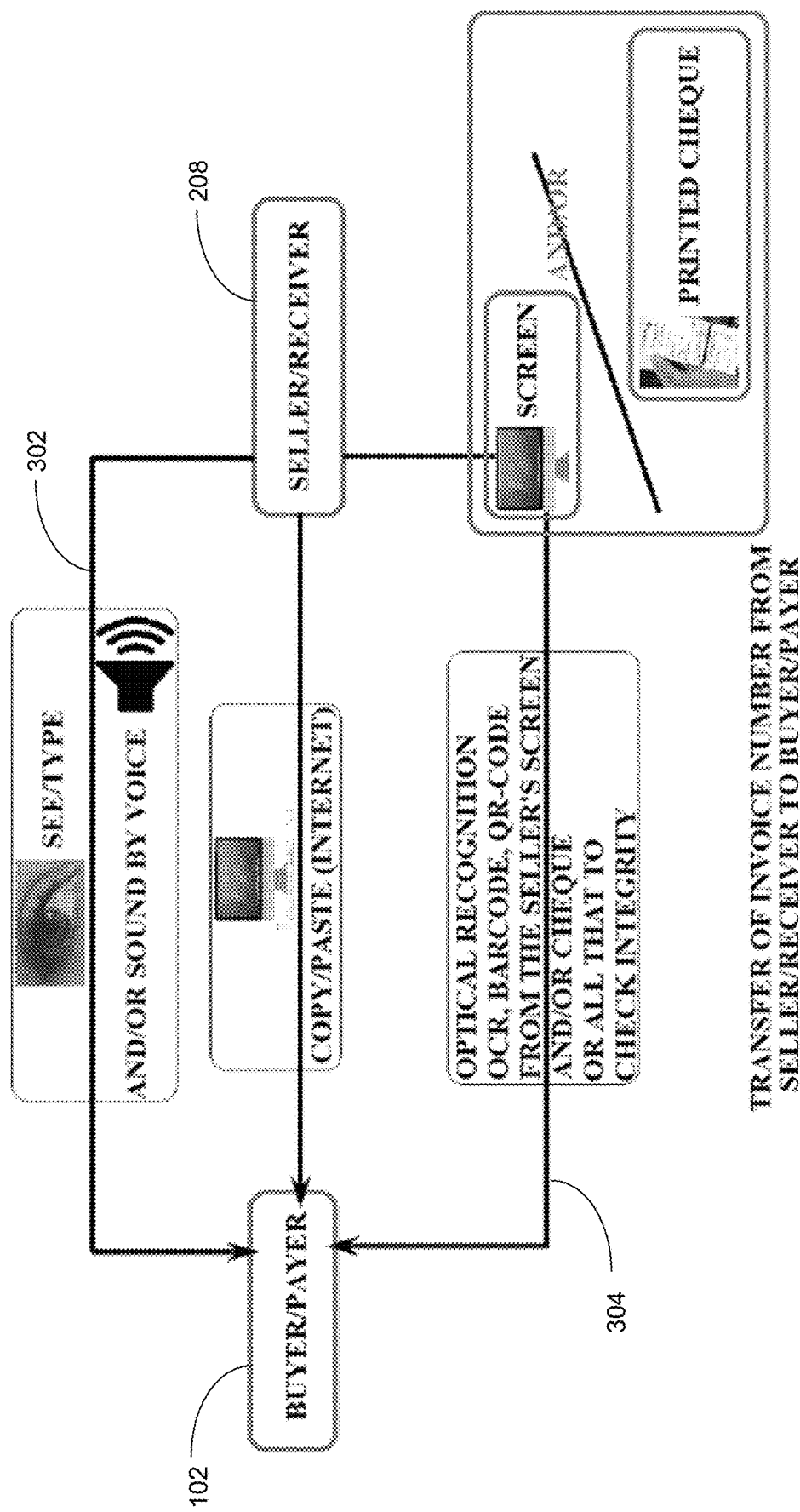

FIG. 3 illustrates possible ways to transfer an invoice number/code/ID from a seller to a buyer in accordance with some embodiments of the present disclosure. The buyer/payer can inspect the number/code/ID and/or get it, and reproduce it by voice, typing is, and/or copying/pasting (Internet payment), and/or use optical character recognition (OCR) techniques, and/or any other way (for example, wireless/wave-based) to transfer/get the invoice number/code/ID to his device, which has access to his bank account (bank, where account is located, is connected to proposed invoice database).

Figure 4:
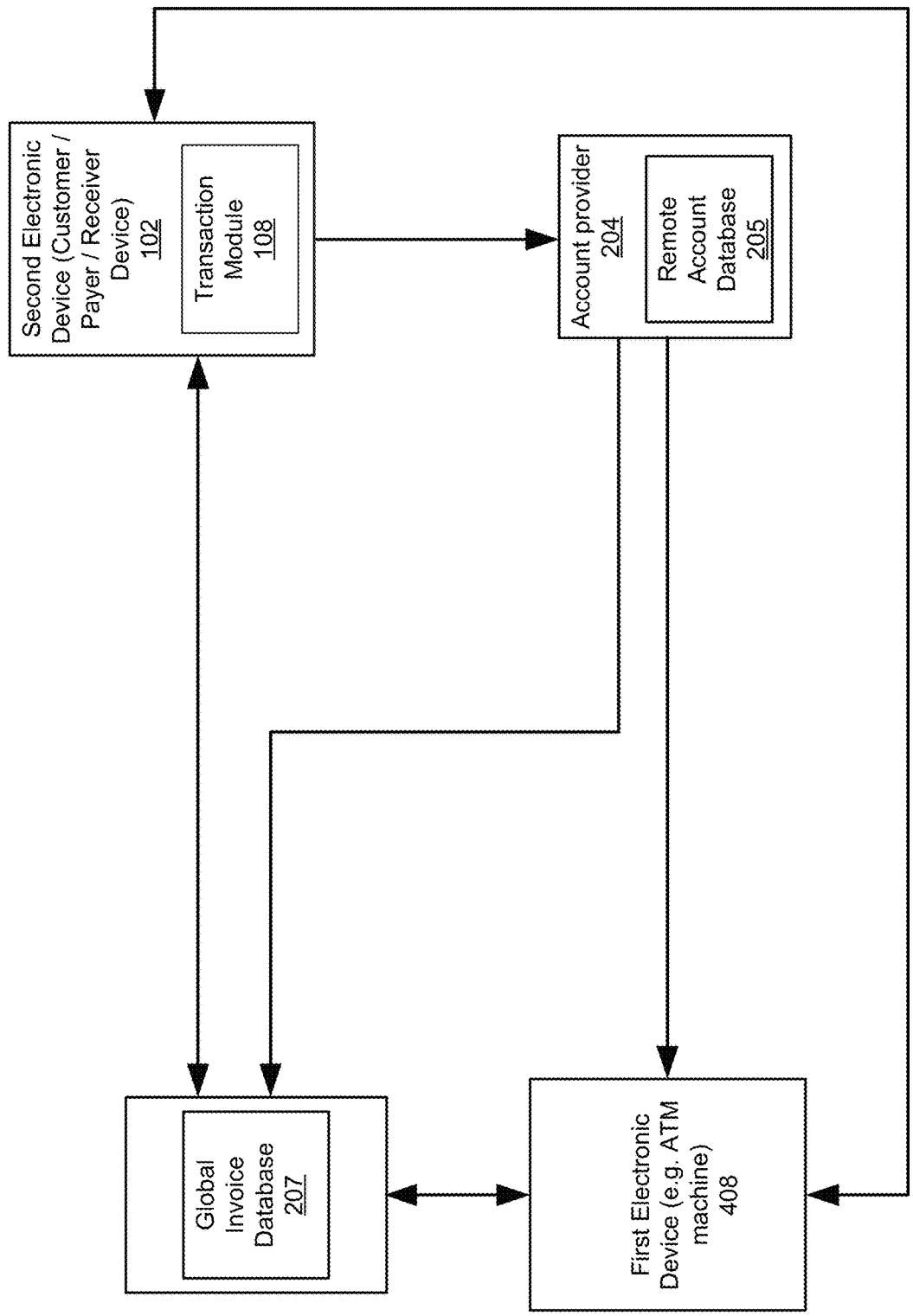

FIG. 4 is a block diagram illustrating a transaction system for cash withdrawal from a cash machine without a financial transaction card (e.g., credit card, debit card, ATM card) in accordance with an embodiment of the present disclosure.

Figure 5:
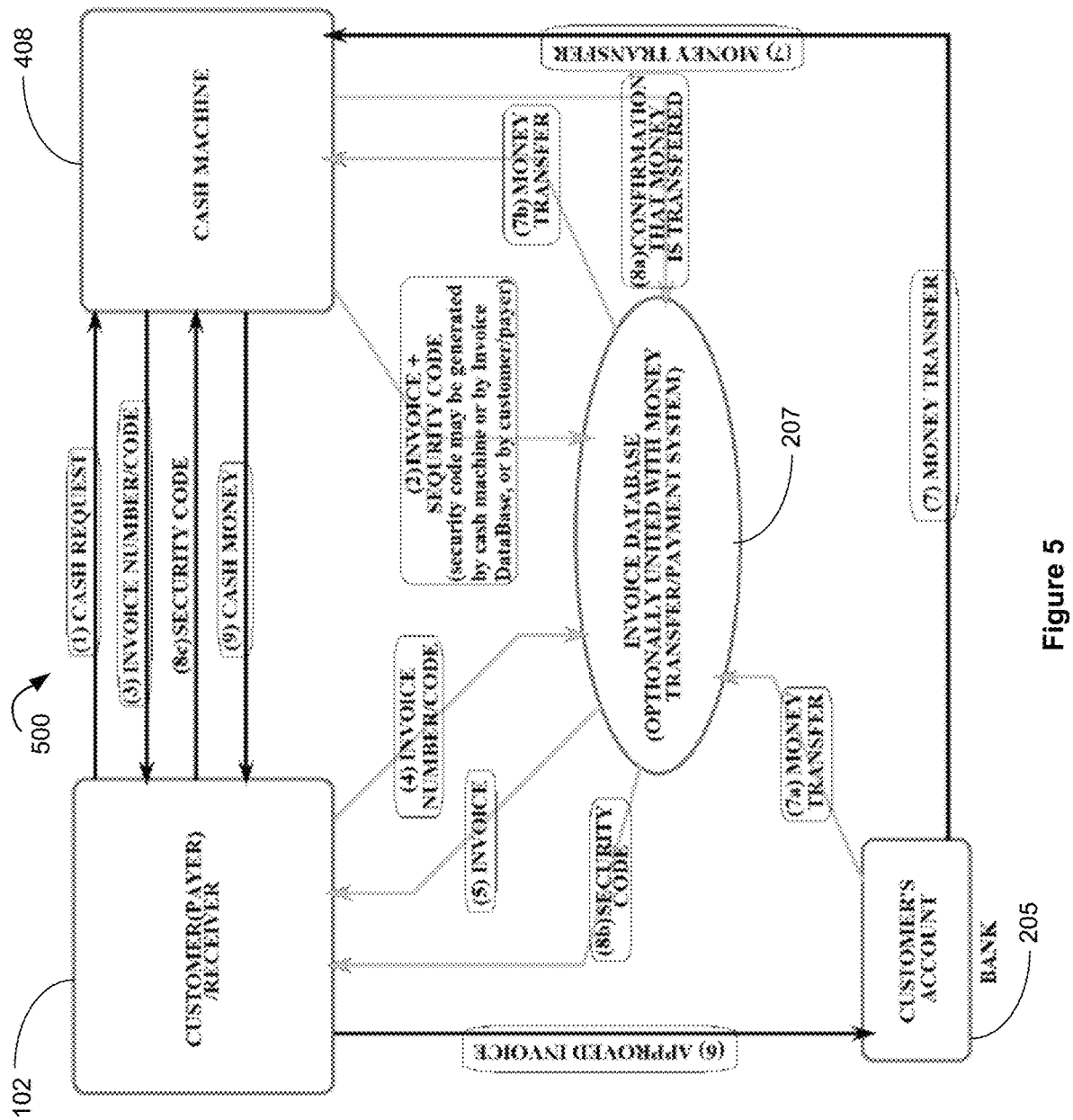

FIG. 5 illustrates a process for cash withdrawal from a cash machine without a financial transaction card (e.g., credit card, debit card, ATM card) in accordance with an embodiment of the present disclosure.

Figure 6:
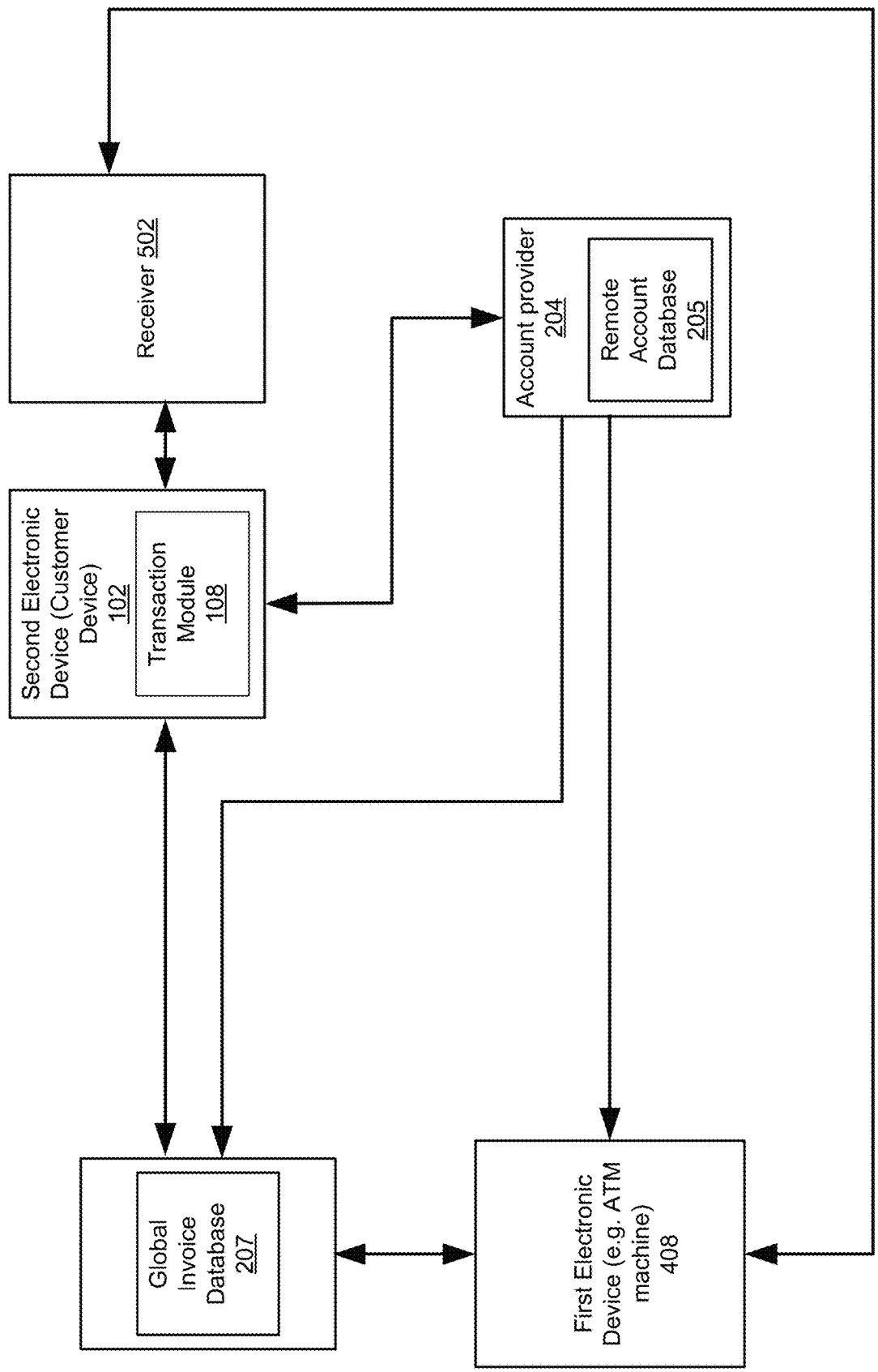

FIG. 6 is a block diagram illustrating cash withdrawal from a cash machine by a person other than the account owner (money transfer) in accordance with an embodiment of the present disclosure.

Figure 7:
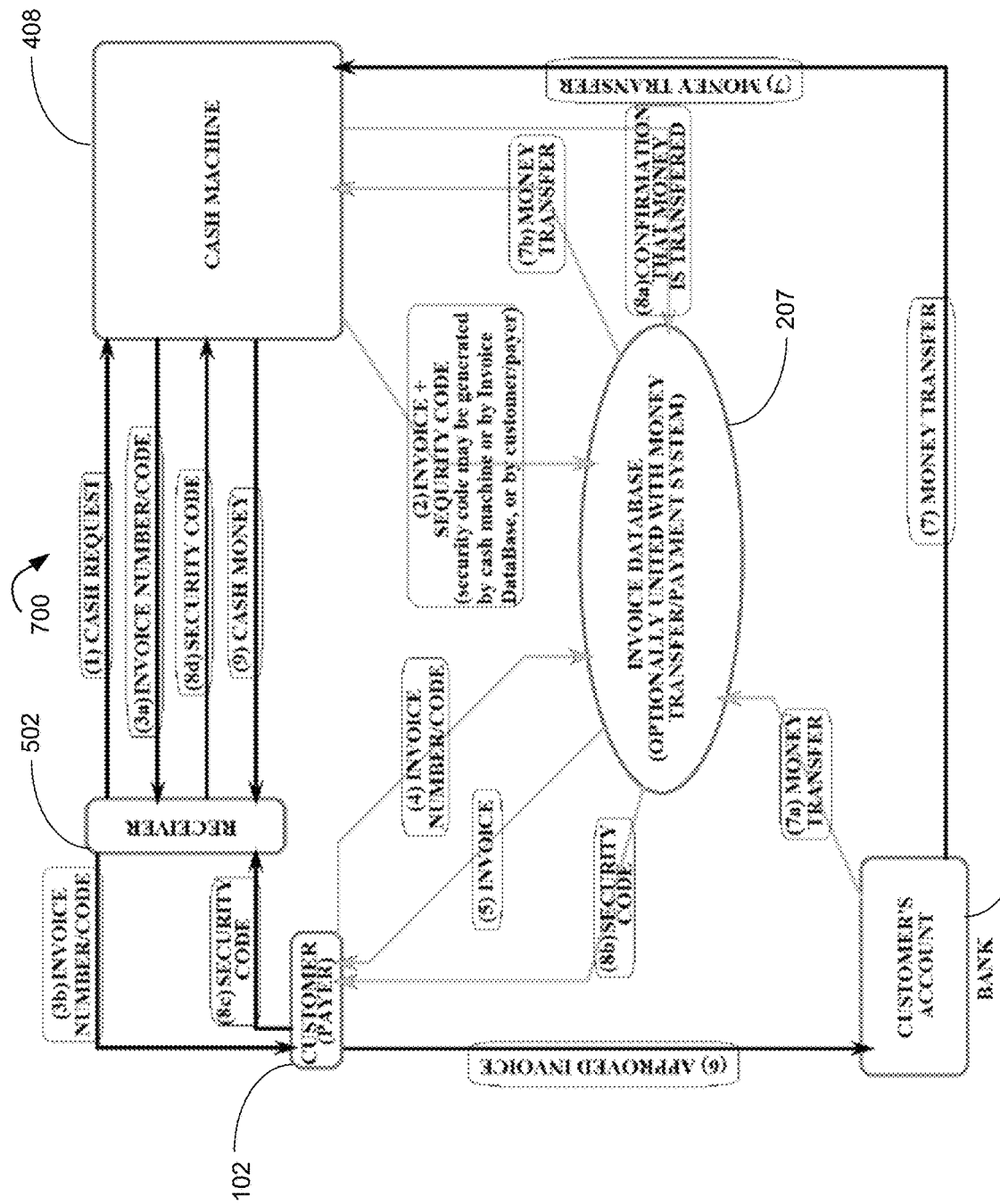

FIG. 7 illustrates a process for cash withdrawal from a cash machine by a person other than the account owner (money transfer) in accordance with an embodiment of the present disclosure.

Figure 8:
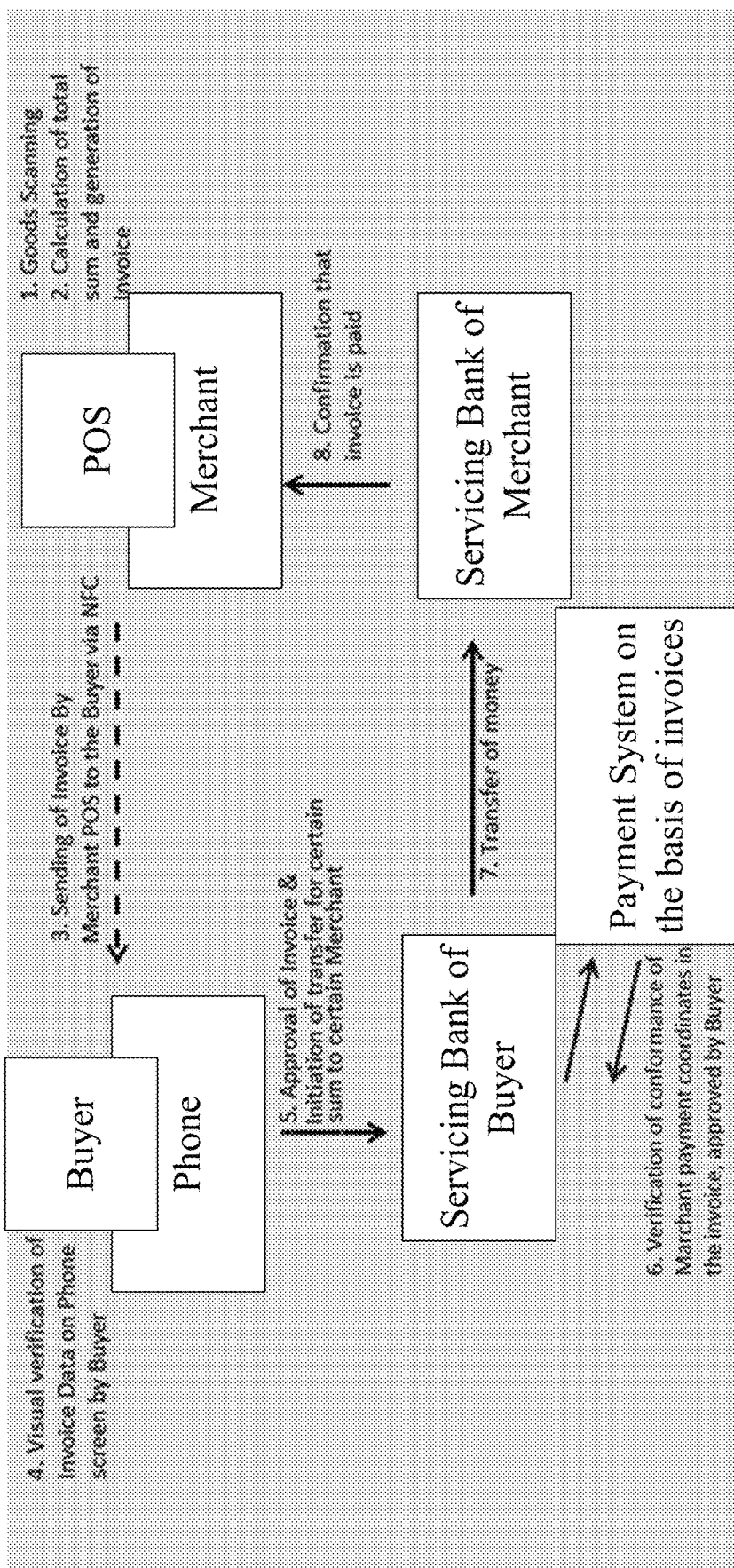

FIG. 8 illustrates a possible payment procedure for a sale-purchase transaction between a buyer and a merchant using a payment system based on invoices in accordance with an embodiment of the present disclosure.

Figure 9:
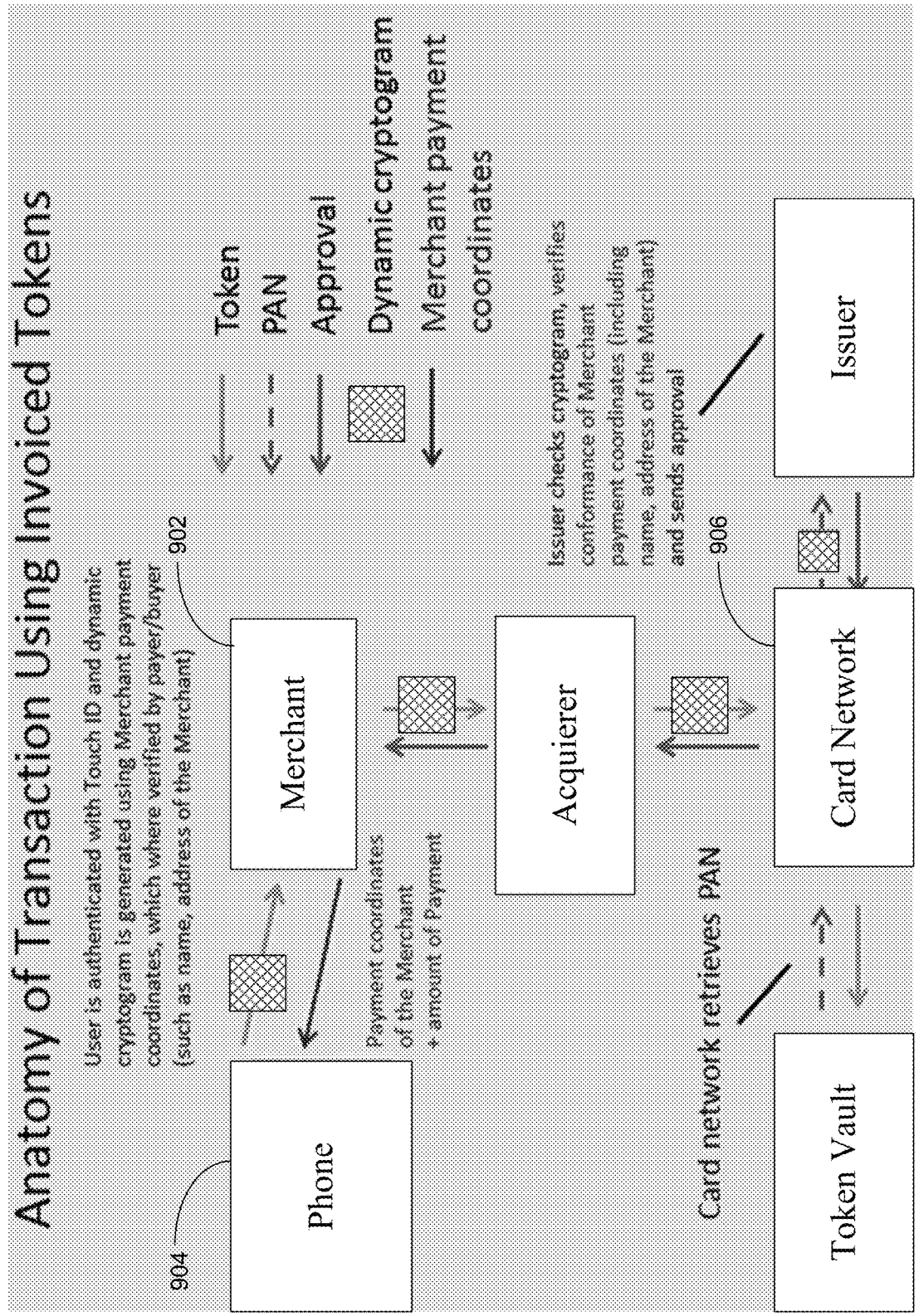

FIG. 9 illustrates a payment procedure for sale-purchase transactions between a buyer and a merchant, using invoiced tokens in accordance with an embodiment of the present disclosure.

Figure 10:
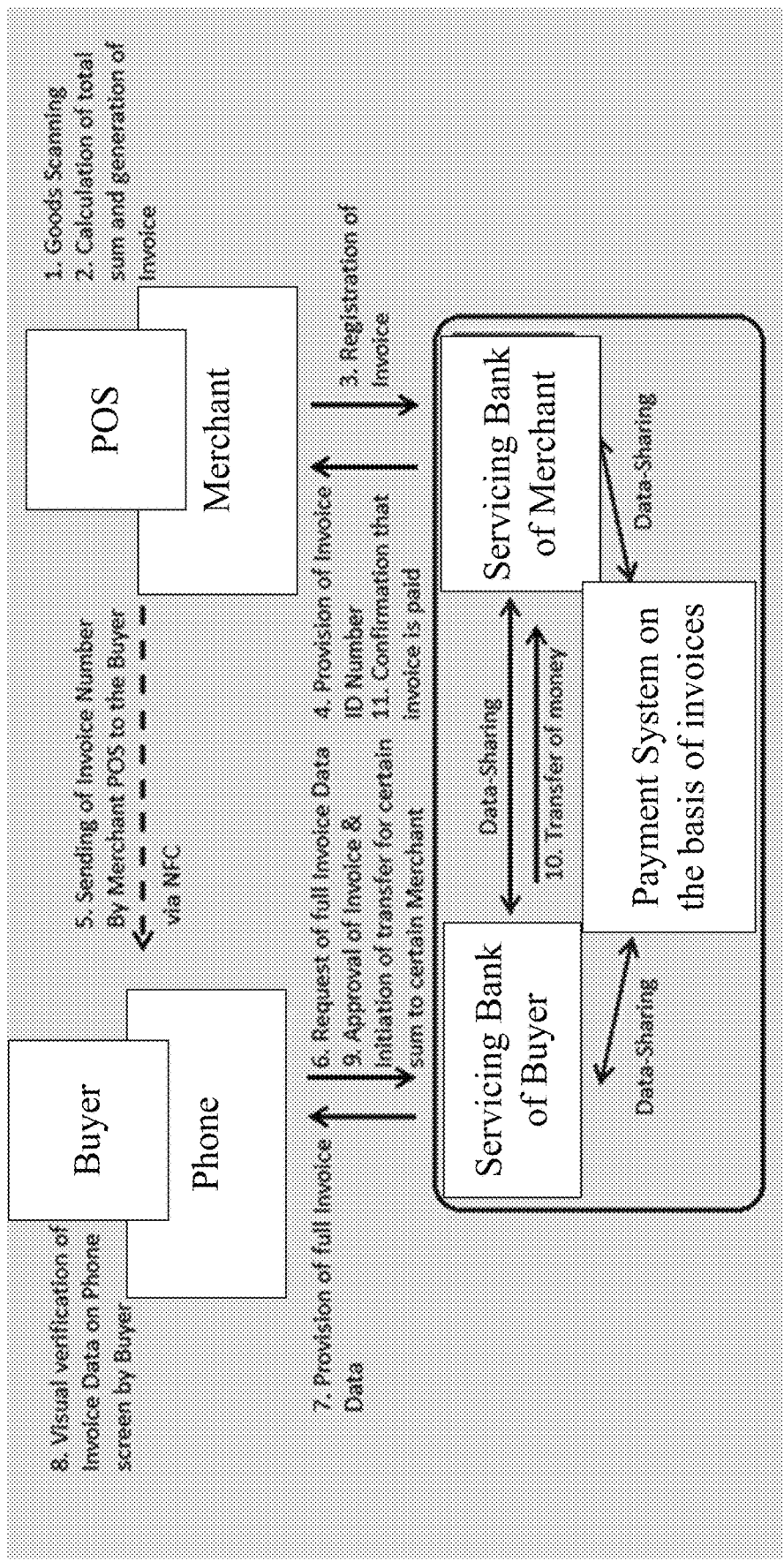

FIG. 10 illustrates a payment procedure for sale-purchase transactions between a buyer and a merchant using a global database of invoices.

DETAILED DESCRIPTION

Reference will now be made in detail to implementations of the present application as illustrated in the accompanying drawings. The same reference indicators will be used throughout the drawings and the following detailed description to refer to the same or like parts. Those of ordinary skill in the art will realize that the following detailed description of the present application is illustrative only and is not intended to be in any way limiting. Other embodiments of the present application will readily suggest themselves to such skilled persons having benefit of this disclosure.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
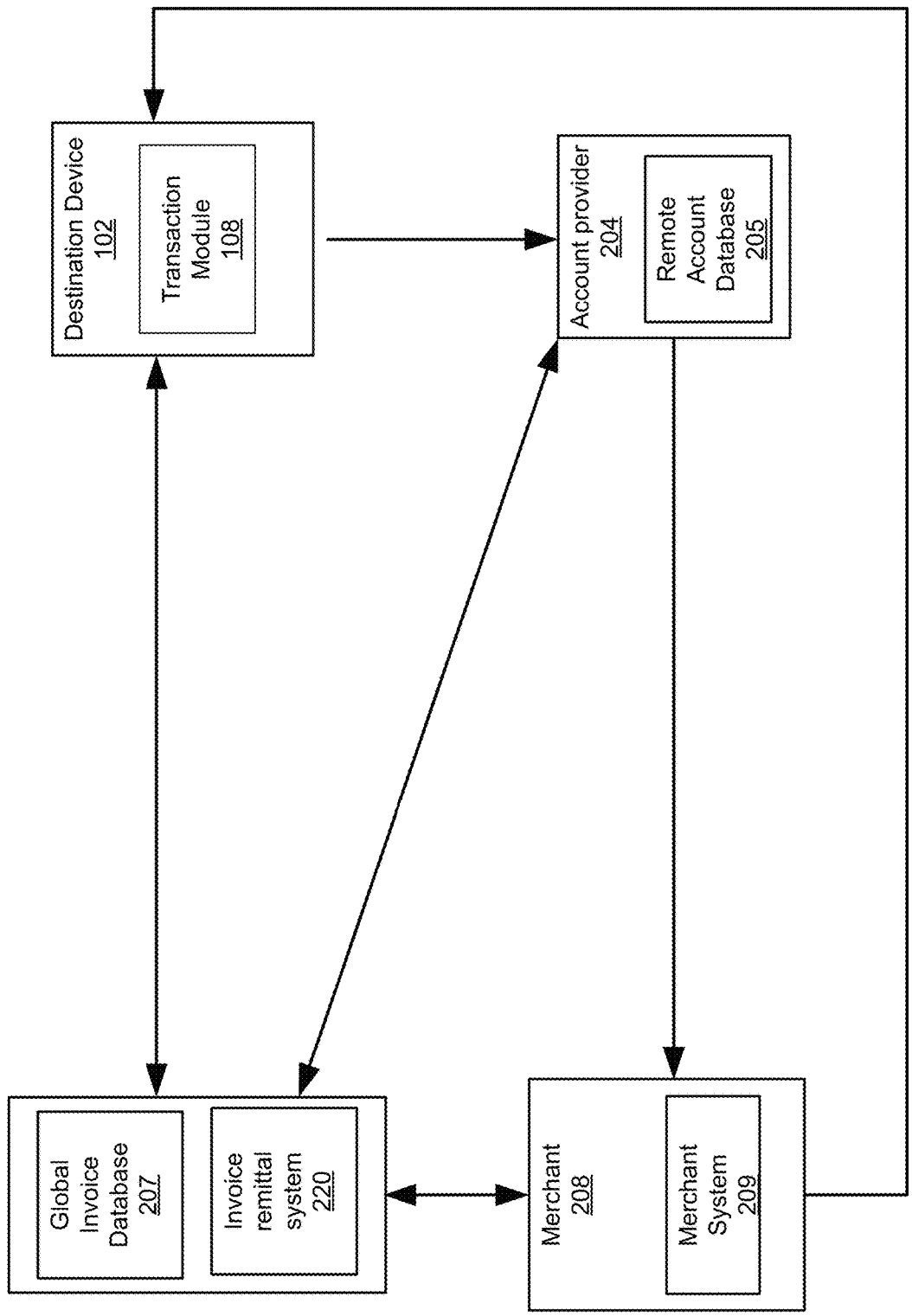
FIG. 1 is a block diagram illustrating a transaction system in accordance with some implementations.
Figure 2:
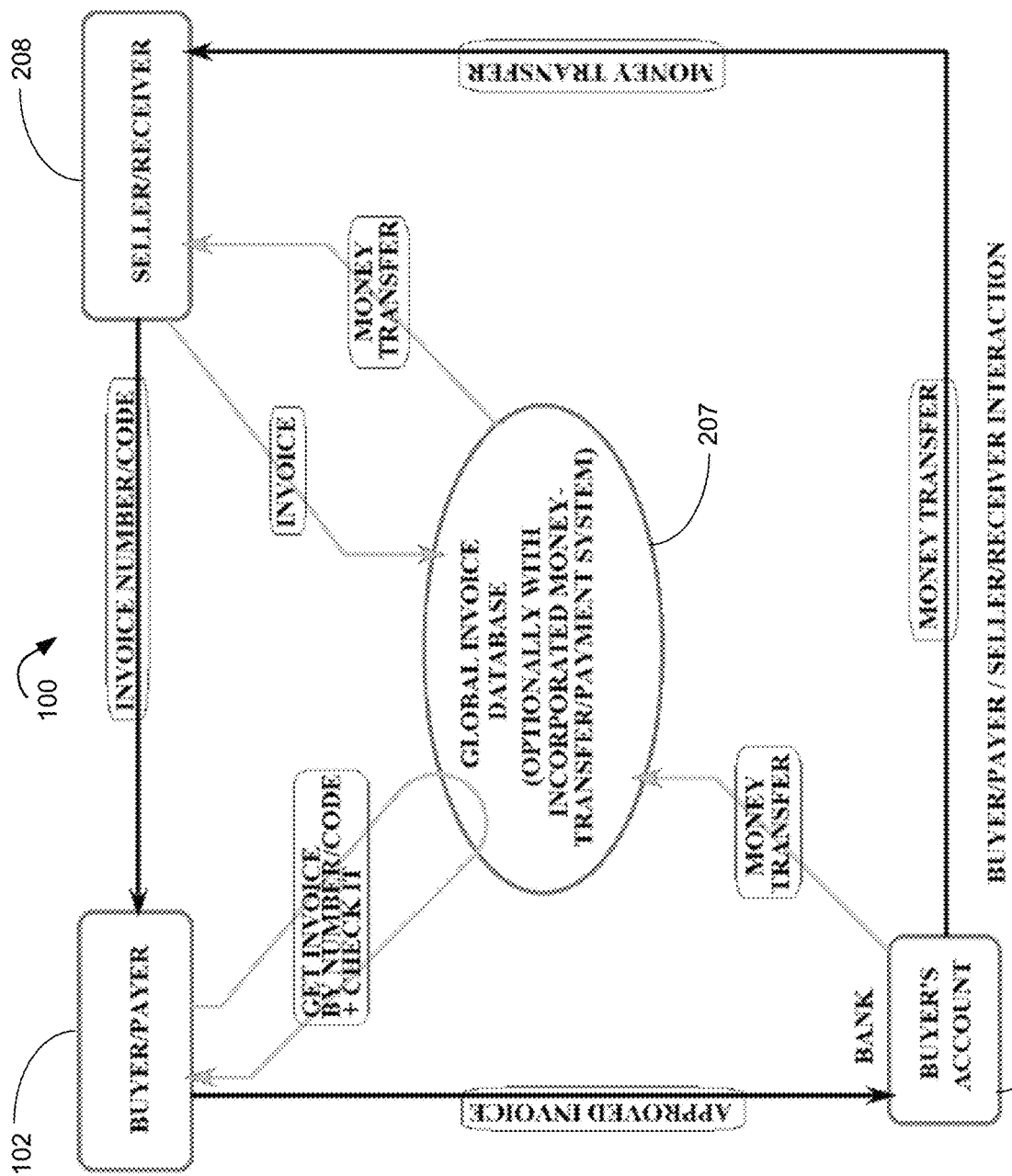
FIG. 2 illustrate the interaction between a seller and a buyer in accordance with an embodiment of the present disclosure. Seller/receiver puts an invoice into global database of invoices and gives the invoice number/code/ID to the buyer/payer. The buyer/payer checks the invoice by querying the global invoice database by the invoice number/ code/ID. After the buyer's/payer's approval the invoice is sent to the buyer's/payer's bank, which also may contact the global database for verification and transfers money to the receiver/seller. The payment can be also sent not directly, but via the proposed payment system.

A new payment system based on global source (database) of invoices is provided in the present disclosure. Referring to FIGS. 1 and 2, a seller/receiver (merchant) 208 puts an invoice into a global database 207 and transmits the invoice number/code/ID to a buyer/payer 102. The buyer/payer 102 contacts the global invoice database 207, verifies the invoice and sends it to his bank 204 to pay. The bank 204 can also verify the invoice by using the global invoice database 207.

Any seller/receiver 208 is able to put an invoice into the database 207 and anybody who has the number/code/ID of the invoice can pay it. Referring to FIG. 3, the number/code/ID of the invoice can be obtained by the payer/buyer 102 simply by seeing/typing the number, by copy/pasting (Internet payment) and/or by optical recognition (digits/numbers and/or barcode, and/or QR code) from the screen and/or check provided by the seller/receiver to the buyer/payer, and/or (is not illustrated in the FIG. 3) via wireless/wave-base signal or otherwise.

The new payment system 100 overcomes potential flaws of financial transaction card (e.g., credit card, debit card, ATM card), since no access to the user's account is given to any third parties.

The new payment system provides personal responsibility to the cash funds receiver 208 on why and for what each sum of money transferred to him is for. Being based on this principle, every state, city or other municipality is able to get more control on financial operations and tax all the profits, which have to be taxed. Even for vegetable markets, Flee markets, Farmer's markets, and similar markets that are typically under documented, it is possible for the applicable municipalities to tax the goods and merchandise sold using the disclosed systems and methods. Moreover, advantageously, every buyer can get a history of paid bills, including the identity of the goods seller 208. This can be useful in situations where the buyer would like to return the goods (e.g. if something is wrong with goods). This approach advantageously imposes higher operational control and provides for the possibility to lower the quantity of unlicensed transactional activities.

In some embodiments, the Internet is used to conduct transactions and the buyer/payer 102 may generate an invoice himself and pay it.

Thus, with continued reference to FIGS. 1 and 2, the present disclosure provides a method for secure purchasing in which, at a first electronic device 208 associated with a merchant, the first electronic device having one or more processors and memory an invoice is generated. The invoice comprises an amount to be remitted and a merchant identification. In some embodiments the merchant identification comprises a merchant name and a merchant address. In some embodiments the invoice further comprises the identification of one or more goods.

In some embodiments the invoice is associated with an invoice identification. In some embodiments, the invoice identification is generated by the first electronic device 208. In other embodiments, the invoice is generated by the remote invoice database 207 and is transmitted back to the first electronic device 208.

The method continues with the transmission of the invoice to the remote invoice database (207). In some such embodiments, the transmission is performed after the merchant has approved the invoice.

The method continues at a second electronic device 102 associated with a consumer (destination device 102). The second electronic device has one or more processors, memory, and a display. At the second electronic device, the invoice identification is received. In some embodiments, the invoice identification is transmitted from the first electronic device 208 (e.g., by near field communication). In some embodiments, the invoice identification is a unique reference number or pointer to an invoice. As such, in some embodiments the invoice identification serves only to identify a particular invoice but does not include the details of the invoice, such as the goods sold. In some embodiments the invoice identification is a unique number or unique expression that uniquely identifies (i) a merchant and (ii) a transaction associated with the merchant. For instance, in some embodiments, the invoice identification comprises two or more portions, a first portion of which is reserved to identify the merchant and a second portion of which is reserved to identify the transaction. In other embodiments, the invoice identification a single portion that is reserved to identify the transaction. In some embodiments the transaction identifier is time stamped and is no longer used or honored by the system 100 when the time stamp exceeds a time threshold. In some embodiments the merchant sets the time threshold. In some embodiments the time threshold is predetermined (e.g., one hour, four hours, 24 hours, two days, one week, one month, one year, etc.).

Referring to FIG. 3, in some embodiments, the invoice identification is manually inputted by the consumer 302. In other embodiments, the invoice identification is captured by a digital camera within the second electronic device. In some embodiments optical character recognition (OCR) techniques are used. Here, OCR means recognition of digits and/or characters of the invoice number/code/ID, and/or recognition of barcode and/or QR code or all these and/or any other approaches used at the same time to ensure proper recognition. Invoice number/code/ID is displayed at the seller's/receiver's device screen and/or is printed at a check and is read (OCR) by the buyer's/payer's device. Invoice identification can be transmitted also in other ways, which are not presented in the FIG. 3, for example by using wireless/wave-based communication or otherwise.

The method continues at the destination device 102 with the transmission of a request for information about the invoice identified by the invoice identification to the remote invoice database 207. The request includes the invoice identification. Responsive to this request, information about the invoice is received from the remote invoice database 207. The information includes an amount to be remitted and a merchant identification from the remote invoice database 207. In some embodiments, the invoice is transmitted to the second electronic device. The amount to be remitted and the merchant identification from the invoice is displayed on the destination device, along with a prompt (e.g., an affordance such as a radio button) to confirm the invoice.

Responsive to receiving confirmation of the invoice from the consumer, approval of the invoice is transmitted to a remote account database 205 comprising at least one account corresponding to the consumer. In some embodiments, the approval of the invoice transmission includes the invoice. In some embodiments, the approval of the invoice transmission consists of the invoice identification only. In some embodiments, the second electronic device 102 (destination device) confirms the identity of the consumer (e.g., by password or biometrics) as a condition for transmitting the request for information from the invoice or transmitting approval of the invoice.

The method continues at a third electronic device 204 associated with the remote account database 205. The third electronic device comprises one or more processors and memory. After receiving the approval of the invoice from the second electronic device 102, the amount of the invoice is remitted to the merchant. In some embodiments, the payment is remitted in response to receiving approval of the invoice from the second electronic device (102). In some embodiments, the communication of the invoice identification from the second electronic device to the third electronic is deemed by the third electronic device to be approval of the invoice. In some embodiments, third electronic device 204 transmits a request for information regarding the invoice to the remote invoice database 207 and payment is remitted by the third electronic device 204 in response to a confirmation of the invoice information from the remote invoice database 207. In some embodiments, the amount of the invoice is remitted from the third electronic device 204 to an account associated with the merchant.

In some embodiments, the remote invoice database 207 further comprises an invoice remittal system 220. In some embodiments, the third electronic device 204 remits the amount of the invoice to the invoice remittal system 220, and the invoice remittal system 220 remits the amount of the invoice to the merchant.

Cash Withdrawal

Referring to FIGS. 4-6, another aspect of the present disclosure provides a system that also allows a user to receive a cash transfer nearly anywhere and at any time. This money is transferred by a payer from any connection to the system, and at the same time the specified receiver of the cash (the user) may have no physical credentials (e.g. no credit card, no access to bank/payment system client, no credentials/personal ID documents) to receive the money sent to him.

FIG. 5 provides a procedure for cash withdraw from cash machine (or to any other bank servicing point) by a bank customer for himself. A bank customer makes a request for certain amount (FIG. 5, step 1). The cash machine generates an invoice and a security code and registers them in a global database of invoice (FIG. 5, step 2). The security code may be generated optionally by any participant of transaction chain, but must be finally provided to the bank customer. The invoice may be generated optionally by any participant of transaction chain, but the invoice must be finally registered in the global database of invoices 207 and the invoice ID number must be finally provided to the bank customer. After this, the cash machine provides the invoice ID number to the bank customer (FIG. 5, step 3). The customer/payer sends a request with the invoice ID number to the global database of invoices 207 (FIG. 5, step 4) and gets from it the invoice to verify and approve it (FIG. 5, step 5). After positive verification, being approved by the bank customer, the invoice goes to the customer's bank (FIG. 5, step 6). If everything is confirmed, the bank transfers the money to the cash machine (FIG. 5, step 7). In some embodiments, the payment can be also sent not directly, but alternatively via the proposed payment system (FIG. 5, steps 7a, 7b). Having received the money, cash machine generates confirmation that money transfer is done and sends the confirmation to the global invoice database (FIG. 5, step 8a), which sends the security code to the customer/payer (FIG. 5, step 8b). The customer/payer inputs security code to cash machine (FIG. 5, 8c) and gets his money (FIG. 5, step 9).

In particular, FIG. 5 illustrates cash withdrawal from a cash machine without a financial transaction card (e.g., credit card, debit card, ATM card) with the help of the new payment system. A customer 102 makes a request (FIG. 5, step 1) to a cash machine 408. In response, the cash machine 408 generates the invoice and a security code, which are sent to the global database of invoices 207 (FIG. 5, step 2). In some embodiments, the security code is generated by the cash machine 208. In such embodiments, the security code generated by the cash machine becomes available only after the payment is done. In other embodiments, the security code is generated by the payment system. In such embodiments, the security code generated by the payment system becomes available only after the payment is done. In still other embodiments, the security code is generated by the customer 102. In such embodiments, the security code generated by customer becomes valid only after the payment is done.

The method continues with the cash machine 408 providing the invoice number/code/ID to the customer 102 (FIG. 5, step 3), e.g., to a user device 102 associated with the customer. Responsive to this, the customer/payer sends a request with invoice number/code/ID to the global database of invoices 207 (FIG. 5, step 4) and gets the invoice (to verify and approve it) from the global invoice database. In some such embodiments, the security code is disclosed to the payer/customer only after the payment is done by him) (FIG. 5, step 5). Upon approval by the user, the invoice goes to the user's bank 204 (FIG. 5, step 6). If everything is confirmed, the bank sends a money transfer authorization to the cash machine (FIG. 5, step 7). In alternative embodiments, the payment is sent indirectly, via the proposed payment system (FIG. 5, steps 7a, 7b). In such embodiments, authorization for the money is then sent to the respective bank 204 with indication that the money can be withdrawn only from this particular cash machine (or from specified cash machines, for example, from cash machines of the exact city and/or bank) in a limited/specified/any period of time. Having received the money, the cash machine generates confirmation that the money transfer is completed and sends it to the global invoice database (FIG. 5, step 8a), which sends the security code to the customer/payer (FIG. 5, 8b) or makes the security code generated by the customer/payer valid. After confirmation from the cash machine 408, the customer/payer inputs the security code to cash machine (FIG. 5, step 8c) and gets his money (FIG. 5, step 9). In some embodiments, the security code can be input without typing it into the cash machine 408, for instance when the cash machine is equipped with an OCR system to read the security code from the screen of the user's device 202 (in the form of digits/characters, barcode, QR-code or in all these forms at once) or wirelessly.

Referring to FIG. 7, there is shown a procedure for cash withdraw from a cash machine, when a bank customer sends money to the cash machine (or to any other bank servicing point) to be taken by a certain receiver: the receiver makes a request for certain amount (FIG. 7, step 1). The cash machine generates the invoice and a security code and registers them in the global database of invoices (FIG. 7, step 2). The security code may be generated optionally by any participant of transaction chain, but must be finally provided to the bank customer. The invoice may be generated optionally by any participant of the transaction chain, but must be finally registered in the global database of invoices 207 and the invoice ID number must be finally provided to the receiver. A receiver obtains the invoice ID number (FIG. 7, step 3a) and sends to the bank customer (FIG. 7, step 3b). The customer/payer sends a request with invoice ID number to the global database of invoices 207 (FIG. 7, step 4) and gets from the invoice in order to verify and approve it (FIG. 7, step 5). After positive verification, being approved by the bank customer, the invoice goes to the customer's bank (FIG. 7, step 6). If everything is confirmed, the bank transfers the money to the cash machine (FIG. 7, step 7). In some embodiments, the payment can be also sent not directly, but via the proposed payment system (FIG. 7, steps 7a, 7b). Having received the money the cash machine generates confirmation that money transfer is done and sends it to the global database of invoice 207 (FIG. 7, step 8a), which sends the security code to the customer/payer (FIG. 7, step 8b). The customer/payer sends security code to receiver (FIG. 7, step 8c). After that, the receiver is able to enter security code into cash machine (FIG. 7, step 8d) and receive the money (FIG. 7, step 9).

In particular, FIGS. 6 and 7 provide another embodiment in which the money can be sent to another person via a cash machine 408. This embodiment encompasses the possibility of receiving a cash transfer nearly anywhere and at any time, which is transferred by any payer connected to the system, and at the same time the specified receiver may have nearly nothing in his hands (e.g. no credit card, no access to bank/payment system client, no credentials/personal ID documents) to receiver cash money, which were sent to him). FIGS. 6 and 7 are similar to FIGS. 4 and 5, but in this case the person who is receiving money and the owner of the bank account/payer (who is also a customer of the payment system) are different people. There are several additional or modified steps. A person (receiver 502) who wants to receive money obtains the invoice number/code/ID (FIG. 7, step 3a) and sends it to the payer 102 (FIG. 7, step 3b) (whom he knows and who knows him). The payer checks 102 and approves the request from the receiver 502 and sends the invoice/number/ID to the global database of invoices 207 (FIG. 7, step 4) from where he receives the invoice. FIG. 7, steps 4-8b are the same as those of corresponding steps of FIG. 5. There is an additional FIG. 7, step 8c where the customer/payer sends the security code to the receiver. After that, the receiver is able to enter security code into cash machine (FIG. 6, step 8d) and receives the money (FIG. 6, step 9).

The payment system may also require a new type of mobile devices which have a separate secure mode of operation for banking system. Security mode may be switched on by special mechanic gear and/or by entering a password, and/or any other variant of ID. Banking system should be substantially separated from the rest content of the device and run in the secure mode. Secure mode might be even provided by a separate operating system stored in ROM (read-only memory) or even run on a different CPU. Switching between normal mode of the device and secure mode may be done by a separate key, which may be an electronic and/or even a physical key that can be stored separately from the device.

The disclosed systems and methods advantageously allow a user to pay bills for goods or services (e.g., food in restaurant, bills from Internet stores, Taxi services, etc.) without entering any suspicious pages of payment in any Internet sites and without using a credit card or credit card data (or bank cards) (e.g. without risks of the user's bank card information being stolen and/or scammed). The disclosed systems and methods allow a user to ask another party (e.g., the user's friends, relatives, or anybody else) to pay the user's bills (e.g., for food in restaurant, and/or bills of Internet stores, and bills for taxi services, or any other services, and/or for any other goods). Advantageously, the only thing necessary to pay for such specified bill is access to a remote banking system with a unique number or code for each bill to pay. In other words, all and/or any, and/or specified bill(s)-to-pay can be paid and/or funds/money by it/them can be transferred, using only known, comfortable for the person and reliable, proofed by the person remote banking and/or internet payment system(s), and/or payment system(s)—and/or i.e. the most vulnerable section of payment chain in payment process—page(s) of internet shop(s), and/or cash register(s) for bank cards in shops, restaurants and/or in other institutions can be excluded and/or eliminated.

Another aspect of the present disclosure provides for the possibility of taking money from an automatic cash terminal by paying bill(s)-to-pay, which is/are provided by exact automatic cash terminal, and/or i.e. by transferring exact and/or specified sum to exact automatic cash terminal. In some embodiments, such operation is protected, for example, by an additional code, which is valid and can be used just for single, exact operation of cash received from an automatic cash terminal.

In some embodiments, it is possible to ask somebody to transfer money to you, being near any exact automatic cash terminal. To sure your friends, and/or parents, and/or any other person, that it is really you, you can (and/or must) make short video with you face moving/turning and/or with your voice, when you generating bill(s)-to-pay to transfer money to you. Such operation can be (and/or must be) protected (for example) by additional code, which is valid and can be used just for single, exact operation of cash receive from automatic cash terminal. To make such operation, you only need access to automatic cash terminal and access to any link service, and/or any communication service.

Another aspect of the present disclosure provides the possibility to take money from an automatic cash terminal in a particular city by paying bill(s)-to-pay, pointing to this particular city, and/or i.e. by transferring exact and/or specified sum, which will be ready to be cashed by any/exact automatic cash terminal. In some embodiments, such operation can be protected, for example, by an additional code, which is valid and can be used just for single, exact cash reception operation from the automatic cash terminal. To enact such an operation, it is necessary to know and to input into the automatic cash terminal a unique number(s)/code(s) of bill(s)-to-pay and additional protecting codes.

Another aspect of the present disclosure address the problem currently found with financial transactions the providing of bank card and/or bank card information (and/or i.e. access to the place, where money are stored) and key (and/or code, and/or password) to take money from account, and/or i.e. buyer (and/or payer) has bank card(s), and seller device and/or service, and/or utility to take money from bank card(s). Such systems constantly expose the owner of the bank card(s) to the danger that data/information from the card(s) (and/or of the card(s)) can be stolen, and/or i.e. somebody can get access to money and to steal them. The systems and method of the present disclosure address this shortcoming by an inverse principal, and when expressing this new principle in frames of idea/concept of "bank card(s)—cash register for bank card(s)", it is possible to say, that new principle—it is when each payer has available a mobile (or not mobile) apparatus and/or device, and/or utility, and/or service to pay for anything via Internet and/or via cellphone connection, and/or via any other connection through remote banking and/or through any other payment service(s), and each seller of any goods and/or of any services has the possibility (and/or method, and/or system, and/or utility, and/or way) to inform/notify where to pay (and/or to which account payment must be done) and/or how much to pay, and/or for what to pay, and/or any other information, and the fact of payment and the sum of payment will be informed/provided by the system of servicing bank, using any available means, and/or by the same principle/method, by which is presently informed/provided, that payment by bank card is executed. In these scenarios, the seller of any goods or services can use the disclosed systems in which the seller (and/or receiver) can place bill(s)-to-pay with all the necessary information to carry out payment, and the buyer (and/or payer) can demand and/or request bill(s)-to-pay, check and/or pay it/them.

Thus conventional systems act on the principle—here is access to the wallet, take from it the necessary sum of money in favor of payment for something (and if it is taken perhaps take a bigger sum? And if the access to the wallet/account is used without permission?—And these facts really occur). The present disclosure rectifies this principal by substituting it with the principle: there is a slit in the box for money—put inside of this box for money the necessary sum.

Thus it is proposed to substitute transmitted information "this is how to take money" by a new variant of transmitted information—"this is the place, to which you have to put/provide exact sum." This substitute concept is performed by the disclosed systems and methods. It is more safe to share/provide/transmit information "this is the place, to which you have to put/provide exact sum" then with "this is how to take money" because there is no visibility into confidential information. That is the concept of "this is the place, to which you have to put/provide exact sum" cannot be exploited. All that is occurring is the payment of an additional sum to a provided account. In other words, there is no way to use the information "this is the place, to which you have to put/provide exact sum" to steal money from the account of the payer and/or from account of the receiver.

The disclosed systems and methods offer a number of unique characteristics. Seller/receiver can see only that information that is necessary and/or measured information concerning buyer/payer and contrariwise. It is possible to provide, that seller/receiver nor buyer/payer, will not see any information about each other. It is also possible to control and/or to identify who pays, in whose address payment is made, which service(s) and/or goods is/are paid. This provides possibility for each and every state or other applicable municipality to carry out appropriate taxation of all transactions, which are carried out with selling of goods and/or of services, by making the taxation compulsory even for taxi-drivers and/or for sellers of greens on the market to generate bill(s)-to-pay, identifying that they are selling goods and/or services of specified sums. Thus when there is a defect in the goods or serves (e.g., when somebody get poisoned by groceries which were purchased on the market)—it is possible to track and to find seller, and to carry out investigation in case of necessity (for example, when payments are made from phone number to phone number, like it is often in Kenya, using M-Pesa).

Codes/numbers of necessary bill(s)-to-pay can be sent to any client. By these codes/numbers the client goes through/via his global remote banking access (and/or access to any other payment system(s)) can demand all (and/or any, and/or specified) the necessary information about bill(s)-to-pay, proof of this information (the sum of payment, and/or for what payment is made, and/or to whom payment is made, and/or any other information), and, when everything is right—to make payment. There are no complex forms or complex steps to execute the transaction. The only things needed to make the right payment is a code/number of payment and remote banking access (and/or access to any other payment system(s)).

In some embodiments, it is possible to define, from which seller(s)/provider(s) of goods and/or services bill(s)-to-pay can be paid by somebody (for example by you children), and/or to pay these bill(s)-to-pay being on the distance and/or having just the contact with (for example) your child by phone (and/or via any link service(s)). In some embodiments, it is possible to provide bill(s)-to-pay into the system (and/or in favor of exact payer/buyer). In some embodiments, it is possible to simplify taxation and/or registration of tax payer. Anybody who is providing services and/or who is selling goods,—just obligated to generate/issue bill(s)-to-pay, pointing, that payment is done for services and/or for goods, and/or anybody, who is providing services and/or who is selling goods—must register special account and/or phone number for business activity. The payer/buyer will be informed from whom he is buying services/good (and/or having electronic traceable receipt), the state (and/or government of the state) will be informed concerning what must be taxed, the budget of the state will be enriched, and bureaucracy will be lowered. In some embodiments, the systems and methods of the present disclosure provide the possibility to track all, especially suspicious and/or criminal, and/or terroristic fund-transfers.

FIG. 4-5 provide a method for secure withdrawal of funds. In the method, at a first electronic device 408, where the first electronic device has one or more processors and memory, an invoice is generated comprising an amount to be withdrawn and a location to be dispensed. In some embodiments, the first electronic device is an ATM machine. In some embodiments the location to be dispensed specifies an automated teller machine (ATM), bank, or merchant. The invoice is associated with an invoice identification. In some embodiments, the invoice identification is generated by the first electronic device 408. In some embodiments, the invoice is generated by a remote invoice database 207 and transmitted back to the first electronic device 408. The invoice is also associated with a security code. In some embodiments the security code is generated by a device 102 associated with a user. In some embodiments, the security code is generated by the first electronic device 408. In some embodiments, the security code is generated by the remote invoice database 207.

The method continues with the transmission of the invoice to a remote invoice database 207.

The method continues at the second electronic device 102 associated with an account holder. In some embodiments, the second electronic device 102 is a personal portable electronic device (e.g., a smartphone). The account holder is different from the user of the first electronic device (e.g., the account holder is not the receiver of the funds). The second electronic device 102 comprises one or more processors, memory, and a display. The second electronic device 102 receives the invoice identification. In some embodiments, the invoice identification is transmitted from the first electronic device (e.g., by near field communication). In some embodiments, the invoice identification is manually inputted by the consumer. In some embodiments, the invoice identification is captured by a digital camera within the second electronic device 102. A request for information about the invoice is transmitted to the remote invoice database 207. The request includes the invoice identification. Responsive to this request, information about the invoice is received from the remote invoice database. The information includes the amount to be withdrawn and the location to be dispensed. In some embodiments, the invoice is transmitted to the second electronic device 102.

The amount to be withdrawn, the location to be dispensed, and a prompt to confirm the invoice is displayed at the second electronic device.

Responsive to receiving confirmation of the invoice from the consumer, approval of the invoice is transmitted to a remote account database 205 comprising at least one account corresponding to the account holder. In some embodiments, the approval of the invoice includes the invoice itself. In some embodiments, the approval of the invoice includes the invoice identification but not the invoice. In some embodiments, the second electronic device 102 confirms the identity of the consumer (e.g., by password or biometrics) as a condition for transmitting the request for information from the invoice or transmitting approval of the invoice.

At a third electronic device 204 associated with the remote account database 205, the third electronic device having one or more processors and memory, the method continues. After receiving the approval of the invoice from the second electronic device 102, a conditional authorization is transmitted from the third electronic device 204 to a fourth electronic device at the location where the cash is to be dispensed for dispensing the amount to be withdrawn at the location to be dispensed. In some embodiments, the authorization is transmitted to the invoice database 205 and the invoice database transmits an authorization to the fourth electronic device at the location to be dispensed. In some embodiments, the authorization is transmitted to an electronic device at the location to be dispensed. The authorization is conditioned on input of the security code at an electronic device at the location to be dispensed.

At the fourth electronic device at the location to be dispensed (e.g., an ATM, merchant register, bank terminal), the fourth electronic device having one or more processors, memory, and an input the method continues. In some embodiments, the fourth electronic device is the same as the first electronic device. In some embodiments, the input of the fourth electronic device is, for example a touchscreen, a number-pad, a mouse, etc.). At the fourth electronic device, after receiving the conditional authorization from the third electronic device, an inputted security code is received. In response to determining the that inputted security code matches the security code associated with the invoice, the amount to be withdrawn is dispensed.

Enhanced Token System

Another aspect of the present disclosure is a payment system which benefits banks, retailers and bank clients, by providing unique level of security. The main idea of the offered payment system is that payments are carried out in the user-active way in the form of direct money transfers, which are initiated by buyer/payer in favor of seller/receiver, where Invoices are provided by receiver and include coordinates, which can be easily identified by payer/buyer as true. Using the same principle it was developed new modification of token, which transforms token into permission to take a specified sum for a specified seller/receiver from a specified account of a specified buyer.

In accordance with this aspect of the present disclosure, a novel payment system is provided that benefits banks, retailers and bank clients, by providing a unique level of security. Payments are carried out in the user-active way in the form of direct money transfers, which are initiated by the buyer/payer in favor of the seller/receiver, where invoices are provided by the receiver and include coordinates, which can be easily identified by the payer/buyer as true. Using the same principle the present disclosure provides a new modified token system, which transforms token into permission to take a specified sum from a specified seller/receiver from a specified account of a specified buyer.

Each payment is carried out in the user-active way in the form of direct money transfers, which are initiated by a buyer/payer in favor of a seller/receiver. Invoices with coordinates of the receiver are provided by the receiver (for example, by a POS-terminal of the shop) and these invoices include, but are not limited to, the payment coordinates of seller/receiver, receiver's legal/official name, address (country, state, city, street, building number), which can be easily identified by the payer/buyer as true (referred to herein as checkable-coordinates).

These checkable-coordinates of the receiver/seller are used as an obligatory part of an process initiated by the buyer/payer payment order together with bank coordinates of the receiver/seller. These checkable-coordinates of the receiver/seller together with his bank coordinates are registered in the Payment System on the basis of invoices, and a payment order will be accepted and fulfilled by the buyer's/payer's servicing bank/payment system only when the checkable-coordinates and the bank coordinates of receiver/seller conform to what is registered in the payment system on the basis of invoices and/or fixed in the payment system of merchant servicing bank. If any of abovementioned coordinates do not conform to the registry, the payment will be declined by the payer's bank/merchant's bank/payment System.

This system is well suited for physical shopping, where the merchant definitely has known, recognizable and checkable-coordinates, such as shop name, shop address (country, state, city, street, building number, etc.). As such, this embodiment of the disclosure makes checkable-coordinates and a specified transaction amount an intrinsic part of a payment order that is initiated by a buyer/payer on the basis of an invoice (provided by receiver/Merchant/POS). Only a specified amount will be withdrawn from the buyer's/payer's account and only in favor of a specified receiver/merchant. If bank account coordinates are substituted by scammers, such payment order with bank coordinates, which do not conform to the receiver's name, address, are not realized/performed by buyer's/payer's servicing bank.

Payment procedures for sale-purchase transactions between a buyer and merchant (anatomy of payment transaction using the payment system on the basis of invoices) is now described with reference to FIG. 8. Point of Sale (POS) of the Merchant (or on the web-site of interne shop) has constant connection with a payment system with limited access, which is desirable and which allows only for the generation of invoices and to verify whether payment of specified invoices has been successfully done. The process begins when a buyer scans all goods in the shop or adds the goods to the purchase list (FIG. 8, step 1). The user then presses the pay icon (FIG. 8, step 2). In response, the POS calculates the total sum and generates an invoice which is sent to the buyer (e.g., best variant via NFC) (FIG. 8, step 3). The buyer visually verifies the invoice data, which is shown on the screen of smartphone associated with the buyer. The buyer reviews the checkable-coordinates (e.g., name of the shop, its address, etc.), which is known by the buyer. Alternatively, the invoice is printed out for the buyer at or near the POS. If the buyer believes the checkable-coordinates are correct, the buyer approves the invoice (FIG. 8, step 5). A servicing bank of the buyer verifies the conformance of merchant's coordinates. This is done by communication with a payment system using the information from the invoice (FIG. 8, step 6). If the merchant's coordinates are in conformance with the payment system, the buyer's servicing bank fulfills payment by transferring the money to the bank, which services the merchant (FIG. 8, step 7), which confirms to the merchant that the invoice has been paid (FIG. 8, step 8).

In some embodiments, FIG. 8, step 6 is skipped on the basis that if a merchant's bank account coordinates are switched by scammers, then such payment transaction would not be realized by payment systems of servicing banks because such coordinates would not match the coordinates of the merchant bank associated with the invoice.

Referring to FIG. 9, the same user-active payment approach can be realized for token payments. Conventionally, a token must include information about payer's account, a specified source of money (specified credit card) and a recognizable form of permission for a transaction. Although a token is generated randomly, it must comprise information on (1) a payer's account in a payment system, (2) a payment source and (3) a randomly generated recognizable single time permission—all together in a randomly generated token, but using a certain specified algorithm. The systems and methods of the present disclosure advantageously improve upon the token system. A token must be generated using specified additional checkable information by the payer such as price/sum/amount and/or official name of the shop/seller/receiver which must conform to the real payment coordinates in the bank and/or address of the shop/seller/receiver (e.g., including name of country/state, city, street), which must conform to the real payment coordinates of receiver on file with the bank. In some embodiments, the receiver's bank account number is included in the data required for token generation, but this information is not presented or provided for verification to the payer. The payer is able to check whether the amount, the official name and the address of receiver are right, and, for token acceptance they must conform to the account number of receiver, which is registered in the receiver's servicing bank and/or in payment system on the base of invoiced tokens, if receivers account coordinates are substituted by scammers, they would not conform to the account information of the receiver, and such token will be rejected.

Advantageously, the modified token provides the basis for permission to take specified sum in favor of a specified seller/receiver (referred to herein as invoiced token). If the next token is predicted by hackers, it would be permission for withdrawal of the same sum, in favor of same receiver, which can easily be identified as a counterfeit token.

FIG. 9 outlines a possible payment procedure for sale-purchase transactions between a buyer and a merchant using an invoiced token. The payment procedure using the invoiced tokens is nearly the same as conventional token methods. However, there are some important differences. At the beginning of the transaction, the merchant provides an amount and the merchant's payment coordinates, part of which, like name and address of the merchant can, can and are verified by a buyer to generate an invoice using the merchant's payment coordinates. All the other parts of the transaction are carried out in the same way as found in a conventional token procedure. The token goes from buyer's phone by the chain from merchant through the acquirer and the card network to the token vault and the Issuer. The issuer checks the cryptogram, verifies conformance of Merchant's payment coordinates and sends approval back.

Accordingly, an aspect of the present disclosure provides is a novel payment system based upon invoices in which payments are carried out in the user-active way in the form of direct money transfers, which are initiated by a buyer/payer in favor of a seller/receiver. The invoices include coordinates of receiver and are provided by the receiver and these invoices include, but not limited to, the payment coordinates of a seller/receiver, the receiver's legal/official name, address (e.g., country, state, city, street, building number, etc.) that can be easily identified by the payer/buyer as true (referred to herein as checkable-coordinates). Being identified as authentic, these checkable-coordinates of the receiver/seller are used as an obligatory part of an initiated by the buyer/payer payment order together with the bank coordinates of the receiver/seller. These easily-checkable-coordinates of the receiver/seller together with the receiver's bank coordinates are registered in a payment system. As such, the payment order will be accepted and fulfilled by the buyer's/payer's servicing bank(s)/payment system only when the checkable-coordinates and bank coordinates of the receiver/seller conform to what is registered with the payment system (and/or fixed in the payment system of the merchant servicing bank). If any of the above-mentioned coordinates do not conform to what is registered—the payment will be declined by the payer's bank/payment system.

Another aspect of the present disclosure provides a new modification of a token transaction system, which transforms the token into permission to take a specified sum and/or in favor of a specified seller/receiver from a specified account of a specified buyer, because the token is generated using information on the amount of the payment and/or the receiver's account information. In some such embodiments, the token is generated using specified additional checkable by the payer coordinates such as price/sum/amount, and/or official name of the shop/seller/receiver, which must conform to the real payment coordinates on file with the bank; and/or address of shop/seller/receiver (including name of country/state, city, street), which must conform to the real payment coordinates of the receiver on file with the bank. To realize payment for sale-purchase transaction, the merchant may provide its payment coordinates to the buyer to generate the token, and part of the payment coordinates, including, but not limited to, name, address of merchant are verified by the buyer and used to generate an invoice. In some embodiments, the exact sum in the token may be realized as a random combination of permissions to take specified sums, which all together will make the necessary exact sum. This combination may be always different as a rule provided that the sum of the token equals the amount requested by Merchant.

In some embodiments, the algorithm and/or "salt" for coding of the Merchant's payment coordinates in the token may be different and/or specified for each generated token. The disclosed systems benefits banks, retailers and bank clients, by providing a unique level of security. Payments are carried out in a user-specified way in the form of direct money transfers which are initiated by the buyer/payer in favor of the seller/receiver. Invoices provided by the receiver include coordinates which can be easily verified by the payer/buyer as genuine. Using the same principle, a new modified token was developed which transforms a token into permission to take a specified sum for a specified seller/receiver from a specified account of a specified buyer.

Referring to FIG. 9, one aspect of the present disclosure provides a method for secure purchasing. At a first electronic device 902 associated with a merchant, the first electronic device having one or more processors and memory, the method is initiated by transmitting, to a second electronic device 904 associated with a consumer, payment coordinates. The payment coordinates include a name and/or address of the merchant and an amount to be remitted to the merchant.

In some such embodiments, at the second electronic device 904 associated with the consumer, the second electronic device having one or more processors and memory, there is received from the first electronic device associated with the merchant the payment coordinates and the amount to be remitted. Optionally, an identity of the merchant (e.g., the payment coordinates or name of a merchant associated with the payment coordinates), the amount to be remitted, and a prompt to confirm a purchase is displayed. Moreover, the payment coordinates and amount to be remitted is encoded in a crytogram and a token associated with a consumer account is generated. In some such embodiments, the consumer account is a credit card account. In some such embodiments, the encoding and/or generating is performed responsive to receiving confirmation of the purchase. The cryptogram/token are then transmitted to the first electronic device.

The method continues by receiving, from the second electronic device 904, a token associated with a means of payment. In some embodiments, the token is a reference to a credit card account. Further a cryptogram encoding the payment coordinates and amount to be remitted is received from the second electronic device.

The method continues by transmitting, to a third electronic device 906 associated with a remote account database, the cryptogram and the token, thereby requesting payment. In some embodiments, the remote account database is associated with a credit card company.

In some embodiments, the method further comprises, at the third electronic device 906 associated with the remote account database, the third electronic device having one or more processors and memory receiving, from the first electronic device 902 associated with the merchant, the payment coordinates and amount to be remitted and retrieving an identification of the consumer account associated with the token. In some embodiments the identification of the consumer account is a primary account number (PAN). The method continues by verifying conformance of the payment coordinates. In some embodiments such verification includes approving the amount charged by the merchant. The method further verifies an identification of the consumer account. In some embodiments the verification of the consumer account includes verification of sufficient funds and/or available credit. The method continues by approving payment of the amount to be remitted to the merchant. In some embodiments, the approving the payment of the amount to be remitted includes transmitting confirmation of the approval to the first electronic device.

Novel Money-Equivalents Payment Systems and Extra-Cash Informing and Handling System Reducing costs and increasing speed to settlements between banks for bank client is highly demanded to keep banks compatible to the new alternative payment systems. At the same time, engagement of novel payment instruments, like crypto-currencies, and making them working as usual money in "white" controllable field is also necessary to keep up with trends. At the same time, reducing operational costs, including paper cash handling will allow banks to remain competitive in the market.

For this purpose, the present disclosure provides an electronic-money-for-banks-system to make settlements cheaper and quicker, carrying out transactions in money equivalents and crypto-equivalents-system to work with such currencies, like Bitcoins, in controllable way, providing them with properties of traceability as common currencies are. To lower costs of paper money handling, the present disclosure provides an extra-cash informing and handling system, to keep paper money mainly circling only between people, merchants and cash machines.

Electronic money systems (not electronic currencies, like Bitcoins) (with conversion of common currency into money different equivalent, like in WebMoney payment system for example), where instead of United States dollars settlements are carried out in wmz (but each 1 USD can be converted any time into 1 wmz and vice-versa) or without to carry out transactions quickly, with very low commission or sometimes even without it, but inside electronic money systems, because it is like relocation inside one box, when you want to take money out of it, commissions are very significant. It means that it is possible to benefit when all or nearly all transactions and account settlements are carried out inside the electronic money system.

The more transactions you make inside electronic money system the more you save. Banks are carrying the major amount of transactions between themselves. It means that if such system would be working to carry out settlements between banks, they will be able to substantially lower costs. The present electronic-money-for-banks-system realizes this goal.

Processing of payments with standard means is expensive, including due to use of various payment systems with various categories of clients. Even in the case of one-time-a-day settlement bank has to carry out real relocations of funds in the amount of residual balance with each bank counteragent. For example, if a state has 150 acting banks, and each of them interacts with all the others—than the maximum possible amount of settlement operations between all of them would make 11,175. In the case of connection of all these 150 banks to the "electronic-money-for-banks-system", when all banks have certain operational deposit on the account of electronic-money-for-banks-system in servicing bank to cover difference between incoming and outgoing payments,—the maximum theoretical quantity of settlement transactions for 150 banks will make 150, because between counteragent settlements are carried during every transaction in money equivalents.

Practically the amount of settlement transactions will be significantly less, because the sum of incoming and outgoing payments are very close to each other across a several day period, e.g. in the case of variations up to ±25-30% from the operational balance, there is no need to carry out relocation of any real funds, therefore, operational costs are significantly lowered.

Such systems allow easy connection of any electronic wallets, payment systems (like WebMoney, M-Pesa) in the same way as with banks, by provision of operational deposit in the necessary currency by the electronic wallet, e.g. for users there will be no complication to transfer money from one electronic wallet to another, like in case of usual account-to-account transfer.

When it is necessary to carry out transactions inside and outside the electronic-money-for-banks-system, the present disclosure provides the following method: when the transaction (money transfer) is carried out between two counteragents, which are connected to the system of electronic money for banks—settlement is carried out inside the system of electronic money for banks, between accounts in electronic-money-for-banks-system, using electronic money equivalents (on demand of local and international legislation counteragents may exchange with correspondent information concerning real money interacting bank accounts of payer and receiver, purpose of payment and with other necessary information). If one of the counteragents is not connected to the electronic-money-for-banks-system—settlement is carried out in accordance with standard procedures.

Thus, the present disclosure provides an electronic-money-for-banks-system, where each counteragent (bank, or other counteragent) carries out all settlements by transactions inside the system of electronic money in money equivalents and residual balance settlement in real currency is carried out only between counteragent and the electronic-money-for-banks-system, to cover negative balance or to withdraw extra-money on the balance of counteragent account in the system. In some such embodiments, each participating bank transfers a certain amount of real money to the bank account of the electronic-money-for-banks-system, as operating balance/deposit, and receives the same, conforming amount of electronic money equivalents. All settlements are carried out in money equivalents between counteragent-banks, providing immediate settlements. Electronic money equivalents may be exchanged back to real money by request on one to one bases. In some such embodiments, the necessary information about payer, receiver and purpose of payment of each transaction, settled in equivalents, is shared between counteragents in accordance with applicable law using the disclosed system of electronic money for banks and/or other informational channels.

Implementation of money equivalents for crypto-currencies also can provide significant benefits. In the case of electronic currencies, like Bitcoins, there is a constant fear that your money can be stolen in anon-traceable way. On the other hand, crypto-currencies are popular among criminals, because the transactions in them are not traceable.

But many physical and legal entities looking at the crypto-currencies as a form of investment. The majority of entities working with any given crypto-currency are interested in the currency being secured, and that the crypto-currency operates in accordance with applicable law and further that the crypto-currency does not have criminal origins or associations.

For this purpose, the present disclosure provides a system-of-electronic-money-equivalent(s) for electronic (crypto)-currencies, which provides the possibility to use electronic currency equivalents inside a crypto-equivalents-system, providing not only safety of transactions to the clients, but bringing such crypto-currencies, like Bitcoins, into "white" controllable field.

To make crypto-currencies transactions traceable and more secured, a client orders and pays for purchase of a specified amount of a specified crypto-currency units in favor of his crypto-currency-account (the crypto-equivalents-system makes a purchase of a crypto-currency unit(s) from outside on the client's order) and in exchange the client is provided with an account inside the crypto-equivalents-system with a corresponding amount of crypto-currency-equivalents, which can be used to carry out any and all transactions inside the electronic money system using the crypto-currency-equivalents, until the client no longer chooses to transfer to the other account or exchange crypto-currency equivalents for other currency. Then, crypto-currency-equivalents or their equivalent in a certain specified currency will be transferred to the account specified by client. Purchase by the system of real crypto-currency units is the guaranty that it is able at any time to exchange them and return equivalent to the customer.

In the case of a crypto-equivalents-system it is possible to make any transaction as if operating with money in a common electronic wallet or even on the standard bank account. In some embodiments, each transfer in crypto-currency equivalents is accompanied (including, but not limited to) with a certain purpose of payment, list of purchased goods/services and/or other points, providing a lawful basis to withdraw payment back in case of non-fulfillment of obligations by the other side, which receives payment.

New solutions for safer and cheaper handling are also necessary for paper money. For this purpose the present disclosure provides a system designed to decrease the amount of costly transportation of cash from shops to bank storage using armored vehicles and guards. When paper money is used, it is handled in secure way. But if money is brought to a shop in small amounts by customers—they can be taken in small amounts by people too.

The idea of extra-money informing and handling system is based on the use in shops, which demand secured-transportation-of-cash-services, cash machines, which can accept and release cash together with functionality of a system to inform clients (including but not limited to customers of all engaged banks), where they can take cash without commission or with certain bonus. The sum of the bonus will be taken from stores and other entities, which will deposit paper cash into the above referenced cash machines, but it will be considerably lower from them, than cost of guarded transportation of cash.

Another aspect of the present disclosure provides a system-of-electronic-money-equivalents for electronic(crypto)-currencies (referred to herein as a crypto-equivalents-system), like Bitcoins, to make crypto-currency transactions traceable and more secured, where a client orders and pays to crypto-equivalents-system for purchase of a specified amount of a specified crypto-currency units (i.e. the crypto-equivalents-system makes a purchase of crypto-currency units from outside on the client's order) and in exchange the client is provided with an account inside the crypto-equivalents-system with a corresponding amount of crypto-currency-equivalents, which can be used to carry out any and all transactions inside the electronic money system using the crypto-currency-equivalents or can be exchanged for other currency. In some such embodiments, when the client decides to transfer to the other account or exchange crypto-currency equivalents for other currency, then crypto-currency-equivalents or their equivalent in a certain specified currency will be transferred to the account specified by client. Purchase by the system of real crypto-currency units is the guaranty that it is able at any time to exchange them and return equivalent to the customer. In some embodiments, each transfer in crypto-currency equivalents is accompanied with a certain purpose of payment, a list of purchased goods/services and/or other points, providing a lawful basis to withdraw payment back in case of non-fulfillment of obligations by other side, which receives payment.

Innovative, Highly Secured User Active Payment System on the Basis of Direct Money Transfers and Global Database of Invoices Current systems, like a) magnet stripe credit cards, b) chip credit cards, c) payment systems, based on tokens, are based on a user-passive nature, providing permission to withdraw money from a client's account. Token payment systems or credit cards provide permission to withdraw any sum, and the customer is (i) unable to specify the amount, and (ii) unable to specify the receiver. They all are vulnerable, because such permissions can be copied, predicted and/or used to take more from controlled account.

To address this problem, the present disclosure provides a new payment system, which benefits banks, retailers and bank clients, and provides a unique level of security. The main idea of the offered payment system is that all transactions are realized in a user-active way as direct money transfers for certain sum, initiated by a payer/buyer/sender in favor of a receiver/seller/retailer, and a mechanism of a global database of invoices guarantees that funds will be transferred in favor of the desired receiver. Also the present disclosure provides new mechanisms that provide digital/cyber security of important operations, including payments.

The main idea of the offered payment system is that all transactions are realized in user-active way as direct money transfers for a specified sum, initiated by a payer/buyer/sender in favor of a receiver/seller/retailer, and a mechanism of a global database of invoices guarantees that funds will be transferred in favor of desired receiver.

The principle of the payment system works as follows. A seller/receiver submits an invoice into "global database of invoices" and transmits the invoice id to the buyer/payer. The buyer/payer communicates with the invoice id into the "global database of invoices", receives and verifies the invoice and sends it to buyer's bank to process and pay. Any seller/receiver is able to submit an invoice into the global database of invoices and anyone, who has id of the invoice, can pay it. The Id of the invoice can be obtained by the payer/buyer, including but not limited to via near field communications (or by mean of other wave-transmission), simply by seeing and typing it, by copy/pasting in case of Internet purchase or by optical recognition of barcode or QR-code from the screen or check, provided by the seller to the buyer. The only thing which is passed from the receiver/seller to the buyer/payer is the invoice number, all the other interactions are done between participants of the transaction and their respective banks and/or developed payment system.

If somebody substitutes an invoice number, the requesting invoice payer will be able to see that receiver is wrong and decline transaction. Distinguishable over other payment systems, payer adopts payment on exact sum, for exact services/goods to the exact addressees.

Identification and verification: as a receiver—you have to identify yourself in the payment client. After this from your account in payment system you may generate invoice for the any sum, for any goods, but only in favor of your bank account. The generated invoice in favor of your account is located in the global database of invoices. The identifying number of invoice is provided (for example via NFC or in other way) to the payer. The payer, who has already identified himself using bank/payment system client on his device, requests from his bank and/or payment-system's-global-database-of-invoices abovementioned invoice by invoice number. The full invoice information is provided to the payer from his bank/payment system via protected connection. The payer receives full invoice information, verifies it visually (verifies that a) receiver; b) amount; c) services/goods (if he wants to check them)—conform to the desired). If everything is right—payer confirms payment on the certain sum.

Some embodiments of the present disclosure provide a one touch/two touch procedure. The first touch, which can be carried out automatically, gets an invoice ID number from the receiver/seller to the payer/buyer, the payer's payment client request full invoice information by invoice ID number from the global database of invoices to be verified by payer.

The second touch executes payment on amount and in favor of coordinates, pointed to in the invoice.

Details of a payment procedure for a sale-purchase transaction between a buyer and a merchant, the most desirable anatomy of a payment transaction using global database of invoices is now described with reference to FIG. 10. A point of sale (POS) of the Merchant (or on the web-site of internet shop) has constant connection with a payment system with limited access (desirable), which allows for the generation of the invoice and to verify whether payment by certain invoice is done successfully. When the buyer (FIG. 10, step 1) scans all goods in the shop (or adds to the purchase list), he has to press the icon (FIG. 10, 2) "Pay" and the POS has to calculate the total sum and generate invoice to (FIG. 10, 3) register it in the global database of invoices. The invoice may be generated either by the POS or by the merchant servicing bank, or by the global database of invoices on the basis of the total sum, but must be registered finally in the global database of invoices. The method continues with (FIG. 10, step 4) when the merchant provides the invoice number to the buyer (best variant via NFC). (FIG. 10, step 5). Getting this invoice number by NFC to the buyer's payment client, which (FIG. 10, steps 6-7) automatically requests and accepts full invoice information from the global database of invoices/servicing bank. (FIG. 10, step 8). If everything is right after visual verification on smartphone screen, the buyer (FIG. 10, step 9) provides order to make payment to the payment system and if (FIG. 10, step 10) transaction is approved and carried out—the POS (FIG. 10, step 11) receives information from bank/payment system, that transaction is done. In some embodiments, information is communicated either (a) to the payment system and from it to the bank; or (b) to the bank and the payment system concurrently (the most preferable variant); or (c) to the bank, and from it to the payment system.

The present disclosure further provides a new ecosystem for bank checks issuing, where the bank check is issued for a certain amount and in favor of certain receivers coordinates, pointed in the invoice, requested by an invoice ID number from a global database of invoices. From the moment of the check issuing, the servicing bank of the check issuer will be informed who is the check beneficiary. Such a bank check will get properties of delayed direct money transfer in favor of a certain receiver. The receiver, pointed in (identified in) the check, will be able to accept the bank check in favor of the designated account, re-assign in favor of another account/receiver or cash it, directing it, as money transfer to the certain cash machine. Using the offered payment system on the base of global database of invoices, it is possible to improve the existing bank check/cheque infrastructure, making it impossible and/or useless to attempt to issue fake or stolen checks or to issue unsupported checks. Using the invoice principle of the offered payment system each and every check becomes truly personalized, there is no way to switch the receiver for any scammer, because the bank system is informed of who is the beneficiary of the check in each transaction at the time when the check is issued. Such bank checks will have the property of delayed direct money transfer in favor of certain receiver. The receiver, identified in the check, will be able to accept bank check in favor of a designated account, re-assign in favor of other account/receivers or cash it, thereby directing it as a money transfer to a specified cash machine.

To support the necessity to fulfilling important actions using various devices/gadgets in secured way, including making payments, the present disclosure provides a new type of mobile device designed for secured fulfillment of payments and/or other important actions, in the form of smartphone, tablet, notebook . . . (hereinafter named as smartphone) with additional hardware to work in parallel with the smartphone, which may have everything separate or may use in the same device (including but not limited to) screen, storage battery and/or wave transmitter, but being re-switched to the mode of parallel smartphone, such parallel smartphone will function as independent CPU/computer/device thanks to additional hardware. The parallel smartphone mode may be switched on/off only manually/mechanically. In some embodiments it is provided with certain additional identification to enter in. The parallel smartphone secure mode might be even provided by a separate operating system, stored in ROM (read-only memory). The parallel smartphone may be able to record any information only if record mode is switched ON by manual/mechanical re-switching.

This device is designed to prevent any spy programs from installing on the device, which operates the payment client and provides access to your account(s). The parallel smartphone/CPU is exactly that, what can protect from viruses, because even upgrade of software will be possible only by mechanical re-switching of memory to the recording mode.

To prevent stealing and/or unauthorized use of smartphones and/or other devices (hereinafter named as main device) another aspect of the present disclosure provides a system—main device+smart-watch-bracelet, where the smart-watch-bracelet can be entered in (by password/fingerprint scanning/otherwise)/activated only when smart-watch-bracelet is locked on the wrist and when smart-watch-bracelet is unlocked or cut—smart-watch-bracelet is automatically off and demands re-entering+may send "off" signal to the main device, and where you can activate/enter-in/use main device only when smart-watch-bracelet is activated and enter-in, being locked on your wrist/your alive wrist. In some such embodiments, activation/entering-in or fulfillment of certain/specified actions with the main device may be permitted only by using double-factor identification, when certain code/token/permission accepted by smart-watch-bracelet has to be communicated to the main device to permit certain action. In some such embodiments, there is provided the possibility of quick blocking of the main device and/or making the main device send alarm signal/notices to the police/other security services, constantly indicating (or on a recurring basis) the current position, and/or automatically signaling when distance between main device and smart-watch-bracelet is more than allowed.

Exemplary Embodiments

A new ecosystem for bank check issuing is provided, where the bank check is issued for certain amount and in favor of certain receiver's coordinates (identifying information), identified in the invoice, requested by invoice ID number from a Global Database of invoices. At the moment the check is issued, the servicing bank of the check issuer will be informed who the check beneficiary is. The bank check will have the property of delayed direct money transfer in favor of certain receiver. The receiver, identified in the check, will be able to accept the bank check at a designated account, re-assign in favor of another account/receiver, or cash it, or directing it, as a money transfer, to a specified ATM cash machine.

A new type of mobile device designed for secured fulfillment of payments and/or other important actions, in the form of smartphone, tablet, notebook (hereinafter terms a "smartphone") with additional hardware to work as a parallel smartphone is provided. The new type of mobile device has everything separate in some embodiments. The new type of mobile device uses the same circuitry for the (including but not limited to) screen, storage battery and/or wave transmitter in other embodiments, but in such embodiments is re-switched to the mode of a parallel smartphone. This parallel smartphone functions as an independent CPU/computer/gadget because of the additional hardware. In some such embodiments, the parallel smartphone mode is switched on/off only manually/mechanically (e.g., the user may be challenged to provide additional identification information in order to switch into the parallel smartphone mode). In some embodiments, the parallel smartphone secure mode is provided by a separate pre-installed operating system stored in ROM (read-only memory). In some embodiments, the parallel smartphone is able to record any information only if a record mode is switched ON by manual/mechanical re-switching.

To prevent stealing and/or unauthorized use of smartphones and/or other devices (hereinafter termed a "main device") an aspect of the present disclosure provides a system—main device+smart-watch-bracelet, where the smart-watch-bracelet can be logged into (by password/finger-print scanning/otherwise)/activated only when the smart-watch-bracelet is locked on the wrist. When the smart-watch-bracelet is unlocked or cut, the smart-watch-bracelet is automatically turned off and challenges the user to re-enter their credentials and also sends an "off" signal to the main device. In this embodiment, the user can activate/enter-in/use the main device only when the smart-watch-bracelet is activated and logged into and is locked onto the user's wrist. In some such embodiments, activation/entering-in or fulfillment of certain/specified actions with main device is permitted only by using this double-factor identification (on the smart-watch bracelet and on the main device), when certain code/token/permission, accepted by the smart-watch-bracelet, is communicated to the main device by the smart-watch-bracelet to permit certain action. In some embodiments, the main device is a smart phone. In some embodiments, the is provided possibility of quick blocking of the main device and/or making the main device send an alarm signal/notice to the police/other security services, thereby constantly indicating the current position of the device, and/or automatic signaling when the distance between main device and smart-watch-bracelet is greater than specified threshold distance (e.g., greater than 3 feet, greater than 5 feet, etc.).

Another aspect of the present disclosure provide a new payment system on based upon invoices, in which payments are carried out in the user-active way in the form of direct money transfers, which are initiated by buyer/payer in favor of seller/receiver, where the invoices have coordinates (identifying information) of the receiver are provided by the receiver and these invoices include, but are not limited to, the payment coordinates of the seller/receiver, receiver's legal/official name, address (country, state, city, street, building number), which can be easily identified by payer/buyer as true (hereinafter named as easily-checkable-coordinates). Being identified as true, these easily-checkable-coordinates of the receiver/seller are used as an obligatory part of a payment order initiated by the buyer/payer together with the bank coordinates of the receiver/seller. These easily-checkable-coordinates of the receiver/seller together with his bank coordinates are registered in a Payment System on the base of Invoices, and the payment order is accepted and fulfilled by the buyer's/payer's servicing bank/Payment System only when the easily-checkable-coordinates and bank coordinates of the receiver/seller conform to that registered in Payment System on the base of Invoices (and/or fixed in the payment system of Merchant servicing bank). If any of abovementioned coordinates do not conform to the registered, the payment will be declined by the payer's bank/Payment System.

Another aspect of the present disclosure provides an electronic-money-for-banks-system, where each counteragent (bank, or other counteragent) carries out all settlements by transactions inside the system of electronic money in money equivalents and residual balance settlement in real currency is carried out only between counteragent and Electronic-Money-for-Banks-System, to cover negative balance or to withdraw extra-money on the balance of counteragent account in the system. In some such embodiments, each participating bank transfers certain amount of real money to the bank account of the Electronic-Money-for-Banks-System, as operating balance/deposit, and receives same, conforming amount of electronic money equivalents. All settlements are carried out in money equivalents between counteragent-banks, providing immediate settlements. Electronic money equivalents may be exchanged back to real money by request on one to one bases. In some such embodiments, the necessary information about payer, receiver and purpose of payment of each transaction, settled in equivalents, is shared between counteragents in accordance with applicable law using System of electronic money for banks and/or other informational channels.

Another aspect of the present disclosure provides an extra-cash informing and handling system, which consists from cash machines, which can accept and release cash united together with informing system, which informs client where they can take cash without commission or with certain bonus. The sum of bonus will be taken from stores and other entities, which will deposit paper cash into above cash machines, and paper money will be mainly circulating in the triangle merchants-people-ATMs.

Another aspect of the present disclosure provides a system-of-electronic-money-equivalent(s) for electronic (crypto)-currencies (hereinafter termed a "Crypto-Equivalents-System"), like Bitcoins, to make Crypto-Currencies transactions traceable and more secured, where the client orders and pays to the crypto-equivalents-system for certain amount of certain crypto-currency and in exchange the client is provided with an account inside the crypto-equivalents-system with a corresponding amount of crypto-currency-equivalents, which can be used to carry out all and any transactions inside electronic money system using the crypto-currency-equivalents or exchanged for the equivalent in certain cash. In some such embodiments, each transfer in crypto-currency equivalents is accompanied with a certain purpose of the payment, list of purchased goods/services and/or other points, therefore providing a lawful basis to receive payment back in case of non-fulfillment of obligations by the entity that received payment for such goods/services and/or other points.

CONCLUDING REMARKS

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

Memory optionally includes high-speed random access memory and optionally also includes non-volatile memory, such as one or more magnetic disk storage devices, flash memory devices, or other non-volatile solid-state memory devices. Access to memory by other components of device, such as one or more processors and a peripherals interface, is, optionally, controlled by a memory controller.

A peripherals interface can be used to couple input and output peripherals of the device to one or more processors and memory. The one or more processors run or execute various software programs and/or sets of instructions stored in memory to perform various functions for device and to process data.

Each of the above identified modules and applications correspond to a set of executable instructions for performing one or more functions described above and the methods described in this application (e.g., computer-implemented methods). These modules (i.e., sets of instructions) need not be implemented as separate software programs, procedures or modules, and thus various subsets of these modules are, optionally, combined or otherwise re-arranged in various embodiments. In some embodiments, memory optionally stores a subset of the modules and data structures identified above. Furthermore, memory optionally stores additional modules and data structures not described above.

Accordingly, in other embodiments, the present disclosure provides electronic devices including one or more processors, memory, and optionally a display, where the memory includes instructions for performing all or a portion of one or more methods described herein. For example, electronic devices with instructions for performing only the portions of the disclosed methods associated with a first, second, third device, etc., device are contemplated. E.g., in some embodiments, the electronic device includes instructions for performing steps associated with one or more of a consumer, merchant, remote invoice database, remote account database (e.g., bank, credit institution, etc.), account holder, ATM, etc., as referred to in the methods disclosed herein.

In other embodiments, the present disclosure provides computer readable storage medium (e.g., non-transitory medium) storing one or more programs, the one or more programs including instructions, which when executed by an electronic device with one or more processors and optionally a display, cause the device to perform all or a portion of one or more methods described herein. For example, computer readable storage medium with instructions for performing only the portions of the disclosed methods associated with a first, second, third device, etc., device are contemplated. E.g., in some embodiments, the computer readable storage medium includes instructions for performing steps associated with one or more of a consumer, merchant, remote invoice database, remote account database (e.g., bank, credit institution, etc.), account holder, ATM, etc., as referred to in the methods disclosed herein.

It will also be understood that, although the terms "first," "second," etc. may be used herein to describe various elements, these elements should not be limited by these terms. These terms are only used to distinguish one element from another. For example, a first object could be termed a second object, and, similarly, a second object could be termed a first object, without changing the meaning of the description, so long as all occurrences of the "first object" are renamed consistently and all occurrences of the "second object" are renamed consistently. The first object and the second object are both objects, but they are not the same object.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method for secure purchasing, comprising:
receiving, by a remote invoice system comprising an invoice database, an invoice related to a seller in a transaction, the invoice having an associated invoice identification and invoice details including at least an amount and a seller identifier, the invoice identification being a unique reference pointer to the invoice in the invoice database, the invoice identification having a format excluding an optical recognition code;

storing the invoice in the invoice database;
transmitting, by the remote invoice system, the invoice identification to a point of sale device of the seller, the invoice identification is transmitted to a buyer device via the point of sale device of the seller;
receiving, from the buyer device by the remote invoice system, a request for information about the invoice, the request including the invoice identification associated with the transaction;
retrieving, in response to receiving the request, the invoice details from the invoice database using the invoice identification received in the request;
transmitting the invoice details and a request to confirm the invoice to the buyer device;
receiving, from the buyer device in response to the request to confirm, a confirmation of the invoice, including the invoice identification; and
initiating a funds transfer of the amount from a buyer financial account to a seller financial account.

2. The method of claim 1, wherein the invoice details include a seller name and a seller address.

3. The method of claim 1, further comprising validating, by the remote invoice system, the invoice.

4. The method of claim 1, further comprising:
receiving from the buyer device a confirmation of the identity of the buyer.

5. The method of claim 1, wherein the invoice identification identifies a location of the invoice in the invoice database.

6. The method of claim 1, wherein the invoice identification includes a time stamp and a predefined time threshold.

7. A non-transitory computer-readable storage medium having stored thereon sequences of instructions, the sequences of instructions including instructions which, when executed by a computer based system, cause the computer based system to perform operations comprising:
receiving, by an invoice system, an invoice, the invoice having an associated invoice identification and invoice details including at least an amount and a seller identifier, the invoice identification being a unique reference pointer to the invoice in the invoice database, the invoice identification having a configuration excluding an optical recognition code;
storing the invoice in the invoice database;
transmitting, by the invoice system, the invoice identification to a point of sale device of the seller, the invoice identification is transmitted to a buyer device via the point of sale device of the seller;
receiving, from the buyer device by the invoice system, a request for information about the invoice the request including the invoice identification associated with the transaction;
retrieving the invoice details from the invoice database using the invoice identification received from the buyer device;
transmitting the invoice details and a request to confirm the invoice to the buyer;
receiving, from the buyer device, a confirmation of the invoice and information identifying a buyer financial account; and
initiating a funds transfer of the amount from the buyer financial account to a seller financial account to complete the transaction.

8. A computer based system comprising:
a processor;
a tangible network interface communicating with a tangible, non-transitory memory;
the tangible, non-transitory memory communicating with the processor; and
the processor, when executing a computer program, perform operations comprising:
receiving, by the computer based system, an invoice, the computer based system comprising an invoice database, a processor, and a memory, the invoice having an associated invoice identification and invoice details including at least an amount and a seller identifier, the invoice identification being a unique reference pointer to the invoice in the invoice database, the invoice identification having a configuration excluding an optical recognition code;
storing the invoice in the invoice database;
transmitting, by the computer based system, the invoice identification to a point of sale device of the seller the invoice identification is transmitted to a buyer device via the point of sale device of the seller;
receiving, by the computer based system from the buyer device, a request for information about the invoice, the request including the invoice identification associated with the transaction;
receiving, by the computer based system, the invoice identification from the buyer device;
retrieving the invoice details from the invoice database using the invoice identification received from the buyer device;
transmitting the invoice details and a request to confirm the invoice to the buyer device;
receiving, from the buyer device, a confirmation of the invoice and information identifying a buyer financial account; and
initiating a funds transfer of the amount from the buyer financial account to a seller financial account.

9. A method for secure purchasing, comprising:
receiving, by a remote invoice system including an invoice database, an invoice related to a transaction between a seller and a buyer, the invoice having an associated invoice identification that uniquely identifies the invoice in the invoice database without including invoice details of the transaction, the invoice identification having a configuration excluding an optical recognition code;
storing the invoice in the invoice database of the remote invoice system;
transmitting, by the remote invoice system, the invoice identification to a buyer device of the buyer in the transaction via a point of sale device of the seller in the transaction;
receiving, from the buyer device by the remote invoice system, a request for information about the invoice, the request including the invoice identification;
receiving from the invoice database of the remote invoice system, responsive to the request for information about the invoice and based on the invoice identification included in the request, the invoice details associated with the invoice uniquely identified by the invoice identification and stored in the invoice database;
transmitting, to the buyer device, the invoice details retrieved from the invoice database and a request to confirm the invoice;
receiving, from the buyer device in response to the request to confirm the invoice, a confirmation of the invoice and information identifying a buyer financial account; and initiating, in response to the receiving of the confirmation of the invoice from the buyer device, a transfer of funds from a financial account of the buyer to a financial account of the seller in an amount included in the invoice details.

\* \* \* \* \*